United States Patent
Nakakita et al.

(10) Patent No.: US 11,135,875 B2
(45) Date of Patent: *Oct. 5, 2021

(54) RESIN-METAL COMPOSITE MEMBER FOR TIRE, AND TIRE

(71) Applicant: BRIDGESTONE CORPORATION, Tokyo (JP)

(72) Inventors: Yukinori Nakakita, Tokyo (JP); Hiroyuki Fudemoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,017

(22) Filed: Dec. 13, 2019

(65) Prior Publication Data

US 2020/0114686 A1  Apr. 16, 2020

Related U.S. Application Data

(63) Continuation of application No. PCT/JP2018/019115, filed on May 17, 2018.

(30) Foreign Application Priority Data

Jun. 16, 2017 (JP) .............................. JP2017-118905

(51) Int. Cl.
*B60C 1/00* (2006.01)
*B60C 9/00* (2006.01)
(Continued)

(52) U.S. Cl.
CPC .......... *B60C 1/0041* (2013.01); *B60C 9/0007* (2013.01); *C08G 63/91* (2013.01);
(Continued)

(58) Field of Classification Search
CPC ................ B60C 1/0041; B60C 9/0007; B60C 2001/005; B60C 2009/0021; C08G 63/91; C08L 53/025; C08L 25/10; C08L 2207/04
See application file for complete search history.

(56) References Cited

U.S. PATENT DOCUMENTS

2004/0147639 A1  7/2004  Tsou et al.
2007/0232737 A1  10/2007 Miyazaki
(Continued)

FOREIGN PATENT DOCUMENTS

CN  1524109 A  8/2004
CN  1981011 A  6/2007
(Continued)

OTHER PUBLICATIONS

International Search Report issued in International Application No. PCT/JP2018/019115 dated Aug. 14, 2018.
(Continued)

*Primary Examiner* — Nicholas E Hill
(74) *Attorney, Agent, or Firm* — Solaris Intellectual Property Group, PLLC

(57) ABSTRACT

A resin-metal composite member for a tire, the member including: a metal member; an adhesive layer; and a covering resin layer in this order, wherein: the adhesive layer includes a continuous phase containing a polyester-based thermoplastic elastomer having a polar functional group, and a discontinuous phase containing a styrene-based elastomer, and a ratio of the continuous phase with respect to an entirety of the adhesive layer is from 60% by mass to 93% by mass.

20 Claims, 3 Drawing Sheets

(51) Int. Cl.
*C08G 63/91* (2006.01)
*C08L 23/08* (2006.01)
*C08L 23/12* (2006.01)
*C08L 23/22* (2006.01)
*C08L 25/10* (2006.01)
*C08L 53/02* (2006.01)

(52) U.S. Cl.
CPC .............. *C08L 23/08* (2013.01); *C08L 23/12* (2013.01); *C08L 23/22* (2013.01); *C08L 25/10* (2013.01); *C08L 53/025* (2013.01); *B60C 2001/005* (2013.01); *B60C 2001/0066* (2013.01); *B60C 2009/0021* (2013.01); *C08L 2207/04* (2013.01)

(56) References Cited

U.S. PATENT DOCUMENTS

| | | |
|---|---|---|
| 2008/0029215 A1 | 2/2008 | Delfino et al. |
| 2008/0066843 A1 | 3/2008 | Alvarez et al. |
| 2011/0303337 A1 | 12/2011 | Michiels et al. |
| 2012/0152428 A1 | 6/2012 | Kouno et al. |
| 2012/0267023 A1 | 10/2012 | Abad et al. |
| 2013/0206311 A1 | 8/2013 | Fudemoto et al. |
| 2014/0044964 A1 | 2/2014 | Abad et al. |
| 2014/0045983 A1 | 2/2014 | Abad et al. |
| 2015/0053327 A1 | 2/2015 | Harada et al. |
| 2016/0075182 A1* | 3/2016 | Machida ............... B60C 9/0007 152/452 |
| 2016/0152079 A1 | 6/2016 | Machida et al. |
| 2016/0280008 A1 | 9/2016 | Fudemoto et al. |
| 2018/0169985 A1 | 6/2018 | Nakakita et al. |
| 2020/0115515 A1* | 4/2020 | Nakakita ................ C09J 167/00 |
| 2020/0115599 A1* | 4/2020 | Nakakita ................ B60C 5/007 |
| 2020/0115601 A1* | 4/2020 | Nakakita ................ B60C 15/04 |

FOREIGN PATENT DOCUMENTS

| | | |
|---|---|---|
| CN | 101045840 A | 10/2007 |
| CN | 102548774 A | 7/2012 |
| CN | 102713052 A | 10/2012 |
| CN | 102782035 A | 11/2012 |
| CN | 103080224 A | 5/2013 |
| CN | 103189215 A | 7/2013 |
| CN | 104159753 A | 11/2014 |
| CN | 105163957 A | 12/2015 |
| EP | 1747103 A1 | 1/2007 |
| EP | 2990221 A1 | 3/2016 |
| JP | 2006-213818 A | 8/2006 |
| JP | 2012-046025 A | 3/2012 |
| JP | 2012-82316 A | 4/2012 |
| JP | 2013-53211 A | 3/2013 |
| JP | 2013-82310 A | 5/2013 |
| JP | 2014-509353 A | 4/2014 |
| WO | 03/066353 A1 | 8/2003 |
| WO | 2005/100471 A2 | 10/2005 |
| WO | 2005/113259 A1 | 12/2005 |
| WO | 2011/085199 A2 | 7/2011 |
| WO | 2012/104281 A1 | 8/2012 |
| WO | 2013/129525 A1 | 9/2013 |
| WO | 2014/175453 A1 | 10/2014 |
| WO | 2017/002872 A1 | 1/2017 |

OTHER PUBLICATIONS

Extended European Search Report dated Nov. 10, 2020 issued in corresponding EP Patent Application No. 18817335.5.
Search Report of the notification to grant patent right for invention dated Mar. 30, 2021, from the SIPO in a Chinese patent application No. 2018800399037 corresponding to the instant patent application.

* cited by examiner

RESIN-METAL COMPOSITE MEMBER FOR TIRE, AND TIRE

CROSS-REFERENCE TO RELATED APPLICATIONS

This application is a continuation application of International Application No. PCT/JP2018/019115, filed May 17, 2018. Further, this application claims priority from Japanese Patent Application No. 2017-118905, filed Jun. 16, 2017.

TECHNICAL FIELD

The present disclosure relates to a resin-metal composite member for a tire, and a tire.

BACKGROUND ART

Conventionally, a reinforcing belt member, which is formed by helically winding a metal member as a reinforcing cord, is disposed in a tire body (hereinafter, also referred to as a tire frame) as an attempt to improve durability (stress resistance, internal pressure resistance, and rigidity) of a tire.

A tire is generally provided with a bead which has a function to fix a tire to a rim, and a metal wire is used as a bead wire.

A method of improving durability of adhesion between a metal member provided in a tire and a tire frame by coating the metal member such as a reinforcing cord or a bead wire with a resin material, has been proposed.

For example, a tire including a circular tire frame formed of at least a thermoplastic resin material, in which the tire has a reinforcing cord member which forms a reinforcing cord layer by being wound around an outer circumferential portion of the tire frame in a circumferential direction, and the thermoplastic resin material contains at least a polyester-based thermoplastic elastomer, has been proposed (see, for example, Patent Document 1).

In addition, a composite reinforcement material comprising: one or more reinforcing thread(s); and a layer of a thermoplastic polymer composition that covers each thread individually or several threads collectively, and that includes at least one thermoplastic polymer, the glass transition temperature of which is positive, a poly(p-phenylene ether), and a functionalized unsaturated thermoplastic styrene (TPS) elastomer, the glass transition temperature of which is negative, said TPS elastomer bearing functional groups chosen from an epoxide group, a carboxyl group, an acid anhydride group, and an ester group, has been proposed (see, for example, Patent Document 2).

Patent Document 1: Japanese Patent Application Laid-Open (JP-A) No. 2012-046025
Patent Document 2: International Publication No. 2012/104281

SUMMARY OF INVENTION

Technical Problem

As described above, techniques for improving adhesion between a metal member such as a reinforcing cord or a bead wire and a tire frame by covering the metal member with a resin material have been known. However, a further improvement in adhesion durability is required from the viewpoint of improving durability of a tire.

In addition, even when a tire is exposed to a wet heat environment in driving, it is also required to prevent a decrease in durability due to water (e.g., decrease in durability associated with rust of a metal member and the like).

In view of the above, an object of the present disclosure is to provide a resin-metal composite member for a tire, which is a member containing a metal member to be disposed in a tire, and which is superior in adhesion durability and wet heat durability.

Solution to Problem

Specific means for solving the above problems include the following embodiment.

<1> A resin-metal composite member for a tire, the member comprising: a metal member; an adhesive layer; and a covering resin layer in this order, wherein:
the adhesive layer includes a continuous phase containing a polyester-based thermoplastic elastomer having a polar functional group, and a discontinuous phase containing a styrene-based elastomer, and
a ratio of the continuous phase with respect to an entirety of the adhesive layer is from 60% by mass to 93% by mass.

Advantageous Effects of Invention

According to the present disclosure, a resin-metal composite member for a tire, which is a member containing a metal member to be disposed in a tire, and which is superior in adhesion durability and wet heat durability, can be provided.

DESCRIPTION OF EMBODIMENTS

Figure 1A:
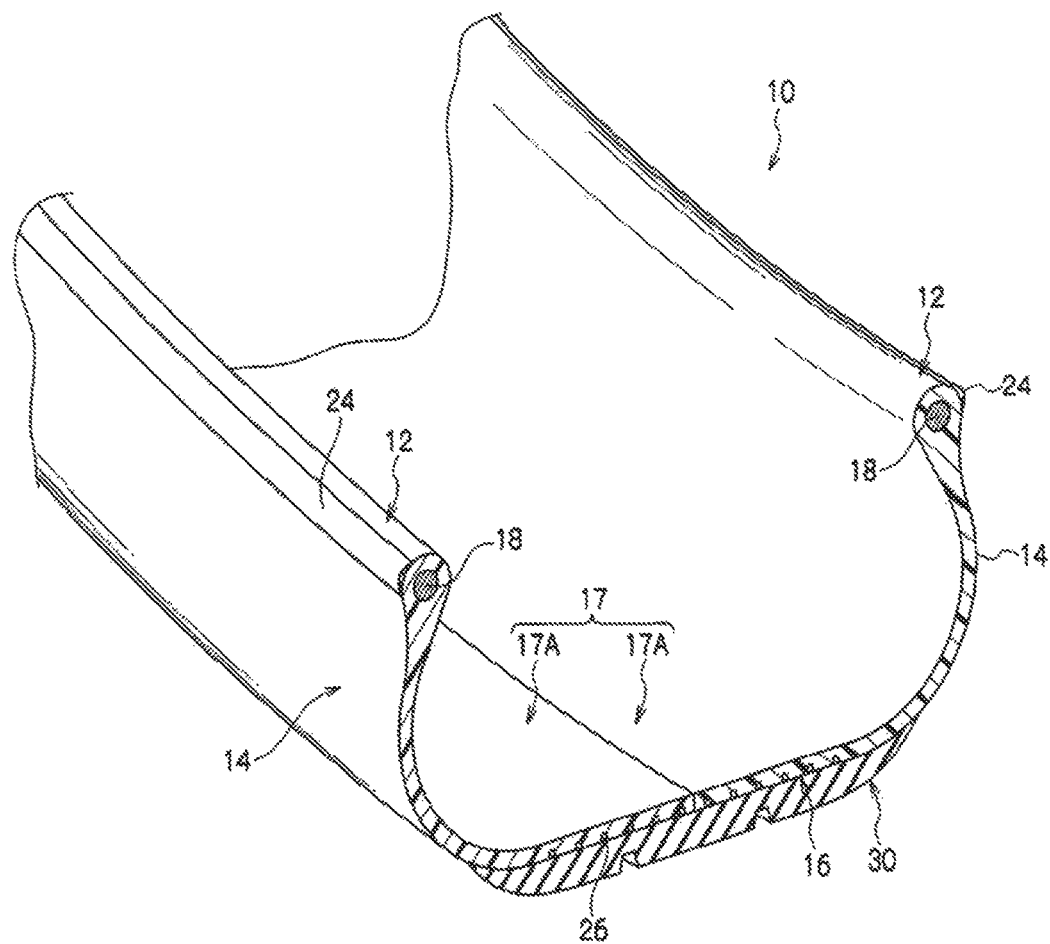
FIG. 1A is a perspective view showing a cross-section of a part of a tire according to an embodiment of the present disclosure.

Specific embodiments of the present disclosure will be described in detail hereinafter. However, it should be noted that the present disclosure is not restricted to the embodiments below but can be carried out with appropriate modification within the scope of the object of the present disclosure.

In the present specification, the term "resin" refers to a concept that encompasses a thermoplastic resin, a thermoplastic elastomer, and a thermosetting resin, but does not encompass a vulcanized rubber. In the following description of resins, the expression "same kinds" refers to those having common skeletons configuring main chains of resins, such as ester-based resins, styrene-based resins, and the like.

In the present specification, the numerical range expressed by "A to B" includes the numerical values "A" and "B" as the lower limit and upper limit values, respectively.

In the present specification, the term "step" encompasses not only an independent step but also a step that cannot be clearly distinguished from another step, as long as the intended purpose of the step is achieved.

In the present specification, the term "thermoplastic resin" refers to a polymer compound that is softened and fluidized as the temperature increases and becomes relatively hard and strong state when cooled, but does not have rubber-like elasticity.

In the present specification, the term "thermoplastic elastomer" refers to a copolymer having a hard segment and a soft segment. Specific examples of the thermoplastic elastomer include a copolymer which comprises a polymer configuring a hard segment that is crystalline and has a high melting point or a hard segment that has a high cohesiveness, and a polymer configuring a soft segment that is amorphous and has a low glass transition temperature. Examples of the thermoplastic elastomer include a material that is softened and fluidized as the temperature increases and becomes relatively hard and strong state when cooled, and has rubber-like elasticity.

Examples of the hard segment include a segment having a structure that contains a rigid group, such as an aromatic group or an alicyclic group, in the main skeleton, or a structure that allows intermolecular packing by an intermolecular hydrogen bond or a $\pi$-$\pi$ interaction. Examples of the soft segment include a segment having a structure that contains a long-chain group (e.g., a long-chain alkylene group) in the main chain, has a high molecular rotational freedom, and exhibits stretchability.

(Resin-Metal Composite Member for Tire)

The resin-metal composite member for a tire (hereinafter, also simply referred to as a "resin-metal composite member") according to an embodiment of the present disclosure includes a metal member, an adhesive layer, and a covering resin layer in this order. The adhesive layer includes a continuous phase containing a polyester-based thermoplastic elastomer having a polar functional group, and a discontinuous phase containing a styrene-based elastomer, wherein a ratio of the continuous phase with respect to an entirety of the adhesive layer is from 60% by mass to 93% by mass.

As described above, a metal member is used as a reinforcing cord of a reinforcing belt member which is provided on and wound around an outer circumferential portion of a tire frame, a bead wire in a bead which has a function to fix a tire to a rim, and the like. A usual tire frame is configured by an elastic material such as rubber or a resin, and an improvement in adhesion between the metal member disposed in a tire as described above and the elastic material of a tire frame or the like is strongly required from the viewpoint of improving durability of a tire.

In addition, since a tire may be exposed to a wet heat environment in driving, wet heat durability is also required.

Under the above circumstances, the present inventors have found that superior adhesion durability and wet heat durability can be achieved by a resin-metal composite member having an adhesive layer and a covering resin layer provided in this order on the surface of a metal member, in which the adhesive layer has a configuration having a continuous phase containing a polyester-based thermoplastic elastomer having a polar functional group, and a discontinuous phase containing a styrene-based elastomer, wherein a ratio of the continuous phase with respect to an entirety of the adhesive layer is from 60% by mass to 93% by mass.

The reason thereof is assumed to be as follows.

First, the term a "polar functional group" refers to a group which has chemical reactivities (functionality) and imparts uneven charge distribution (polarity) in a molecule.

In the above embodiment, the continuous phase of the adhesive layer includes a polyester-based thermoplastic elastomer having a polar functional group. Accordingly, it is thought that the uneven charge distribution due to the polar functional group causes interaction between the metal member and a hydrated hydroxy group on the surface of the adhesive layer, generates attraction therebetween, and provides a good adhesion between the metal member and the adhesive layer.

Then, it is assumed that the difference in rigidity between the metal member and an elastic material such as a tire frame can be reduced by providing a covering resin layer on the metal member via an adhesive layer, whereby the resin-metal composite member provided with a metal member to be disposed in a tire can achieve superior adhesion durability.

In addition, since the discontinuous phase of the adhesive layer contains a styrene-based elastomer, the entirety of the adhesive layer becomes adequately soft and flexible, and stress followability is improved, which results in further increase in adhesion durability, as compared to an adhesive layer consisting only of a polyester-based thermoplastic elastomer. In addition, water barrier properties (water-impermeable properties) of the adhesive layer are improved since the adhesive layer contains a styrene-based elastomer. Accordingly, water hardly reaches the metal member even under a wet heat environment, whereby deterioration of the member due to water (e.g., corrosion and delamination due to rust of the metal member) is reduced, and wet heat durability is improved.

Moreover, it is thought that since the ratio of the continuous phase with respect to the entirety of the adhesive layer is within the range, the entirety of the adhesive layer has an adequate elastic modulus, and both a high adhesion between the continuous phase and the metal member and a high wet heat durability due to the discontinuous phase are achieved to a high degree.

Constituent members of the resin-metal composite member are described below in detail.

The resin-metal composite member has a structure having a metal member, an adhesive layer, and a covering resin layer which are arranged in this order. The shape of the resin-metal composite member is not particularly limited. Examples of the shape of the resin-metal composite member include a cord shape and a sheet shape.

Examples of application of the resin-metal composite member include a reinforcing belt member disposed in a crown portion (an outer circumferential portion) of a tire frame included in a tire and a bead member having a function to fix a tire to a rim.

For example, in one aspect of the application of the resin-metal composite member as a reinforcing belt member, the resin-metal composite member can be used as a belt layer that is formed by arranging one or a plurality of cord-shaped resin-metal composite members at an outer circumferential portion of a tire frame along a circumferential direction of a tire, a crossing belt layer in which a plurality of cord-shaped resin-metal composite members are arranged to form an angle with respect to the circumferential direction of a tire and to cross each other, and the like.

In the resin-metal composite member, examples of the structure "having a metal member, an adhesive layer, and a covering resin layer in this order" include a state in which the surface of the metal member is entirely covered with a covering resin layer via an adhesive layer, and a state in which the surface of the metal member is partially covered with a covering resin layer via an adhesive layer. It is preferred that, at least in a region where the resin-metal composite member is in contact with an elastic member such as a tire frame, a metal member, an adhesive layer which has a relatively high tensile elastic modulus as compared with a covering resin layer, and a covering resin layer are arranged in this order. Although the resin-metal composite member may have another layer in addition to the metal member, the adhesive layer, and the covering resin layer, from the viewpoint of adhesion between the metal member and the covering resin layer, the metal member and the adhesive layer are at least partially in direct contact with each other, and the adhesive layer and the covering resin layer are at least partially in direct contact with each other.

(Metal Member)

The metal member is not particularly limited. For example, a metal cord which is used for a usual rubber tire may be used, if appropriate. Examples of the metal cord include a monofilament cord (a solid wire) including a single metal cord and a multifilament cord (a stranded wire) which is made by twisting a plurality of metal cords. The shape of the metal member is not limited to a wire shape (a cord shape). For example, the metal member may be a plate-shaped metal member.

As the metal member, from the viewpoint of further increasing durability of a tire, a monofilament cord (a solid wire) or a multifilament cord (a stranded wire) is preferred, and a multifilament cord is more preferred. The sectional shape, size (diameter), or the like of the metal member is not particularly limited, and any metal member suitable for a desired tire may be selected and used.

When the metal member is a stranded wire of a plurality of cords, examples of the number of the plurality of cords include from 2 to 10, with from 5 to 9 being preferred.

From the standpoint of satisfying both internal pressure resistance and weight reduction of the tire, the thickness of the metal member is preferably from 0.2 mm to 2 mm, more preferably from 0.8 mm to 1.6 mm. The thickness of the metal member is defined as the number-average value of the thickness measured at five spots that are arbitrarily selected. The thickness of the metal member is determined by the above-described method.

The tensile elastic modulus (hereinafter, unless otherwise specified, the term "elastic modulus" used herein means tensile elastic modulus) of the metal member itself is usually from about 100,000 MPa to about 300,000 MPa, preferably from 120,000 MPa to 270,000 MPa, more preferably from 150,000 MPa to 250,000 MPa. The tensile elastic modulus of the metal member is determined from the slope of a stress-strain curve plotted using a ZWICK-type chuck in a tensile tester.

The elongation at break (tensile elongation at break) of the metal member itself is usually from about 0.1% to about 15%, preferably from 1% to 15%, more preferably from 1% to 10%. The tensile elongation at break of the metal member can be determined from the strain based on a stress-strain curve plotted using a ZWICK-type chuck in a tensile tester.

(Adhesive Layer)

The adhesive layer is disposed between the metal member and the covering resin layer, and includes a continuous phase containing a polyester-based thermoplastic elastomer having a polar functional group, and a discontinuous phase containing a styrene-based elastomer.

Further, a ratio of the continuous phase with respect to an entirety of the adhesive layer is from 60% by mass to 93% by mass.

(Continuous Phase)

The continuous phase contains at least a polyester-based thermoplastic elastomer having a polar functional group, and if necessary, optionally contains other components.

The content of the polyester-based thermoplastic elastomer having a polar functional group, with respect to the entirety of the continuous phase, is preferably 80% by mass or more, more preferably 90% by mass or more, and still more preferably 95% by mass or more.

The continuous phase may contain only one kind of a polyester-based thermoplastic elastomer having a polar functional group or two or more kinds of the polyester-based thermoplastic elastomers. When the continuous phase contains two or more kinds of the polyester-based thermoplastic elastomers each having a polar functional group, the content refers to the total content of the two or more kinds of polyester-based thermoplastic elastomers each having a polar functional group.

(Polyester-Based Thermoplastic Elastomer Having Polar Functional Group)

Examples of the polar functional group include an epoxy group (a group represented by the following (1), wherein each of $R^{11}$, $R^{12}$, and $R^{13}$ independently represents a hydrogen atom or an organic group (e.g., an alkyl group)), a carboxy group (—COOH) and an anhydride group thereof, an amino group (—NH$_2$), an isocyanate group (—NCO), a hydroxy group (—OH), an imino group (=NH), and a silanol group (—SiOH).

The "anhydride group" refers to an anhydride-type group in which H$_2$O has been removed from two carboxy groups (an anhydride group represented by the following (2-1), wherein $R^{21}$ represents a single bond or an optionally substituted alkylene group, and each of $R^{22}$ and $R^{23}$ independently represents a hydrogen atom or an organic group (e.g., an alkyl group)). When H$_2$O is added, the anhydride-type group represented by the following (2-1) becomes a state represented by the following (2-2), that is, a state having two carboxy groups.

Among these groups, from the viewpoint of adhesion to a metal member, an epoxy group, a carboxy group and an anhydride group thereof, a hydroxy group, and an amino group are preferred, and an epoxy group, a carboxy group and an anhydride group thereof, and an amino group are more preferred.

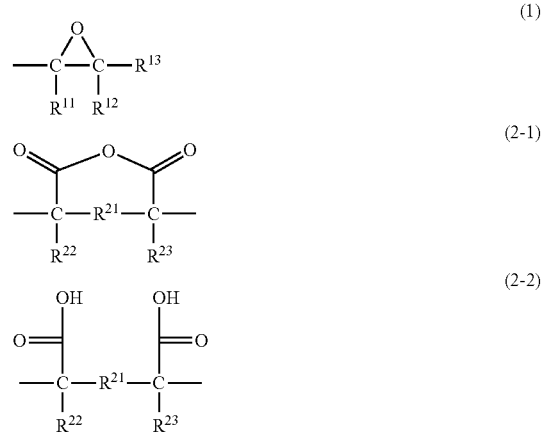

The polyester-based thermoplastic elastomer having a polar functional group can be obtained by modifying a polyester-based thermoplastic elastomer (TPC) by a compound (derivative) having a group which can form a polar functional group. For example, the polyester-based thermoplastic elastomer having a polar functional group can be obtained by chemically bonding (an addition reaction, a graft reaction, or the like) a compound having both a group which can form a polar functional group and a reactive group (e.g., an unsaturated group (an ethylenic carbon-carbon double bond or the like)) to the polyester-based thermoplastic elastomer.

Examples of the derivative which modifies a polyester-based thermoplastic elastomer (a compound having a group which can form a polar functional group) include an epoxy compound having a reactive group, an unsaturated carboxylic acid (e.g., methacrylic acid, maleic acid, fumaric acid, or itaconic acid), an unsaturated carboxylic acid anhydride (e.g., maleic anhydride, citraconic anhydride, itaconic anhydride, or glutaconic anhydride), and another carboxylic acid having a reactive group and an anhydride thereof, an amine compound having a reactive group, an isocyanate compound having a reactive group, an alcohol having a reactive group, and a silane compound having a reactive group, or a derivative thereof.

(Method of Synthesis)

A method of synthesizing the polyester-based thermoplastic elastomer having a polar functional group (hereinafter, also simply referred to as a "polar group-containing TPC") is specifically described below.

In the following description, the method of synthesis is described using a method of modifying the polyester-based thermoplastic elastomer (TPC) by an unsaturated carboxylic acid or an anhydride thereof as an example of the method.

The polar group-containing TPC (a polyester-based thermoplastic elastomer having a polar functional group) can be obtained by, for example, a modification treatment of a molten material of a saturated polyester-based thermoplastic elastomer containing a polyalkylene ether glycol segment by an unsaturated carboxylic acid or a derivative thereof.

The term "modification" refers to a graft modification or a terminal modification of a saturated polyester-based thermoplastic elastomer containing a polyalkylene ether glycol segment by an unsaturated carboxylic acid or a derivative thereof, a transesterification modification, a modification by a decomposition reaction, or the like. The position to which an unsaturated carboxylic acid or a derivative thereof is bonded can be a terminal functional group and an alkyl chain moiety. Particularly, examples of the position include a terminal carboxylic acid, a terminal hydroxy group, and a carbon atom at an α position or a β position with respect to the ether bond in the polyalkylene ether glycol segment. In particular, it is assumed that a large number of bonding occurs at an α position with respect to the ether bond in the polyalkylene ether glycol segment.

(1) Materials to be Blended (A) Saturated Polyester-Based Thermoplastic Elastomer The saturated polyester-based thermoplastic elastomer is generally a block copolymer having a soft segment containing a polyalkylene ether glycol segment and a hard segment containing polyester.

The content of the polyalkylene ether glycol segment in the saturated polyester-based thermoplastic elastomer is preferably 58 to 73% by mass, and more preferably 60 to 70% by mass in the polyester-based elastomer.

Examples of the polyalkylene ether glycol configuring the soft segment include polyethylene glycol, poly(1,2 and 1,3-propylene ether)glycol, poly(tetramethylene ether)glycol, and poly(hexamethylene ether)glycol. The poly(tetramethylene ether)glycol is particularly preferred. As the polyalkylene ether glycol, those having a number-average molecular weight of from 400 to 6,000 are preferred, those having a number-average molecular weight of from 600 to 4,000 are more preferred, and those having a number-average molecular weight of from 1,000 to 3,000 are still more preferred. The "number-average molecular weight" as used herein is a number-average molecular weight measured by gel permeation chromatography (GPC). Calibration of GPC can be performed by using a polytetrahydrofuran calibration kit from POLYMER LABORATORIES LTD., UK.

The saturated polyester-based thermoplastic elastomer can be obtained, for example, by polycondensation of the oligomer obtained by an esterification reaction or a transesterification reaction of i) an aliphatic and/or alicyclic diol having 2 to 12 carbon atoms, ii) an aromatic dicarboxylic acid and/or alicyclic dicarboxylic acid or an alkyl ester thereof, and iii) a polyalkylene ether glycol having a number-average molecular weight of from 400 to 6,000 as raw materials.

Examples of the aliphatic and/or alicyclic diol having 2 to 12 carbon atoms used herein include raw materials for polyester, and in particular, commonly used raw materials for a polyester-based thermoplastic elastomer. Examples of the aliphatic and/or alicyclic diol having 2 to 12 carbon atoms include ethylene glycol, propylene glycol, trimethylene glycol, 1,4-butanediol, 1,4-cyclohexanediol, and 1,4-cyclohexanedimethanol. Among these, 1,4-butanediol and ethylene glycol are preferred, and 1,4-butanediol is particularly preferred. These diols may be used singly, or in mixture of two or more kinds thereof.

Examples of the aromatic dicarboxylic acid and/or alicyclic dicarboxylic acid used herein include raw materials for polyester, and in particular, commonly used raw materials for a polyester-based thermoplastic elastomer. Examples of the aromatic dicarboxylic acid and/or alicyclic dicarboxylic acid include terephthalic acid, isophthalic acid, phthalic acid, 2,6-naphthalenedicarboxylic acid, and cyclohexanedicarboxylic acid. Among these, terephthalic acid and 2,6-naphthalenedicarboxylic acid are preferred, and terephthalic acid is particularly preferred. These dicarboxylic acids may be used in combination of two or more kinds thereof. When an alkyl ester of the aromatic dicarboxylic acid and/or alicyclic dicarboxylic acid is used, a dimethyl ester or diethyl ester of the dicarboxylic acid is used. Examples of a preferred alkyl ester of the aromatic dicarboxylic acid and/or alicyclic dicarboxylic acid include dimethyl terephthalate and 2,6-dimethylnaphthalate.

In addition to the above components, a small amount of trifunctional triol or tricarboxylic acid or an ester thereof may be copolymerized. Furthermore, an aliphatic dicarboxylic acid such as adipic acid or a dialkyl ester thereof may be used as a component for the copolymerization.

Examples of the commercially available polyester-based thermoplastic elastomer include "PRIMALLOY" manufactured by Mitsubishi Chemical Corporation, "PELPRENE" manufactured by TOYOBO CO., LTD., and "HYTREL" manufactured by DU PONT-TORAY CO., LTD.

(B) Unsaturated Carboxylic Acid or Derivative Thereof

Examples of the unsaturated carboxylic acid or a derivative thereof include an unsaturated carboxylic acid such as acrylic acid, maleic acid, fumaric acid, tetrahydrophthalic acid, itaconic acid, citraconic acid, crotonic acid, or isocrotonic acid; an unsaturated carboxylic acid anhydride such as 2-octene-1-yl succinic anhydride, 2-dodecene-1-yl succinic anhydride, 2-octadecen-1-yl succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic acid anhydride, 1-cyclopentene-1,2-dicarboxylic acid anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic acid anhydride, methyl-5-norbornene-2,3-dicarboxylic acid anhydride, endo-bicyclo[2.2.2]oct-5-ene-2,3-dicarboxylic acid anhydride, or bicyclo[2.2.2]oct-7-ene-2,3,5,6-tetracarboxylic acid anhydride; and an unsaturated carboxylate such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, lauryl (meth)acrylate, stearyl (meth)acrylate, glycidyl methacrylate, dimethyl maleate, 2-ethylhexyl maleate, or 2-hydroxyethyl methacrylate. Among these, an unsaturated carboxylic acid anhydride is preferred. These unsaturated carboxylic acids or derivatives thereof may be properly selected according to kinds of copolymers containing a polyalkylene ether glycol segment to be modified, and conditions for the modification, and may be used in combination of two or more kinds thereof. The unsaturated carboxylic acid or a derivative thereof can be added as a solution in an organic solvent.

(C) Radical Generator

Examples of the radical generator used for inducing a radical reaction in the modification treatment include organic and inorganic peroxides such as t-butylhydroperoxide, cumene hydroperoxide, 2,5-dimethylhexane-2,5-dihydroperoxide, 2,5-dimethyl-2,5-bis(tert-butyloxy)hexane, 3,5,5-trimethylhexanoylperoxide, t-butylperoxybenzoate, benzoylperoxide, dicumylperoxide, 1,3-bis(t-butylperoxyisopropyl)benzene, dibutylperoxide, methyl ethyl ketone peroxide, potassium peroxide, or hydrogen peroxide; an azo compound such as 2,2'-azobisisobutyronitrile, 2,2'-azobis(isobutyramide)dihalide, 2,2'-azobis[2-methyl-N-(2-hydroxyethyl)propionamide], or azodi-t-butane; and a carbon radical generator such as a dicumyl radical generator. These radical generators may be properly selected according to kinds of the saturated polyester-based thermoplastic elastomer containing a polyalkylene ether glycol segment, kinds of the unsaturated carboxylic acids or derivatives thereof, and conditions for the modification, and may be used in combination of two or more kinds thereof These radical generators can be added as a solution in an organic solvent. For further improvement in adhesion, a compound having an unsaturated bond (the following (D)) may be used as a modification aid in addition to the radical generators.

(D) Compound Having Unsaturated Bond

The compound having an unsaturated bond refers to a compound having a carbon-carbon multiple bond other than the (B) an unsaturated carboxylic acid or a derivative thereof. Specific examples include vinyl aromatic monomers such as styrene, methyl styrene, ethylstyrene, isopropylstyrene, phenylstyrene, o-methylstyrene, 2,4-dimethylstyrene, o-chlorostyrene, or o-chloromethylstyrene. It is expected that the addition of these compounds may result in an improvement in efficiency of the modification.

(2) Blending Ratio

The blending ratio between the components which configure a polar group-containing TPC is preferably as follows: with respect to 100 parts by mass of (A) a saturated polyester-based thermoplastic elastomer, (B) an unsaturated carboxylic acid or a derivative thereof is preferably 0.01 to 30 parts by mass, more preferably 0.05 to 5 parts by mass, still more preferably 0.1 to 2 parts by mass, and particularly preferably 0.1 to 1 parts by mass, and (C) a radical generator is preferably 0.001 to 3 parts by mass, more preferably 0.005 to 0.5 parts by mass, still more preferably 0.01 to 0.2 parts by mass, and particularly preferably 0.01 to 0.1 parts by mass.

The modification amount of the polar group-containing TPC as measured by infrared absorption spectroscopy is, as a value calculated by the following formula: $A_{1786}/(Ast \times r)$, desirably from 0.01 to 15, preferably from 0.03 to 2.5, more preferably from 0.1 to 2.0, particularly preferably from 0.2 to 1.8.

[Herein $A_{1786}$ is a peak intensity at 1786 cm$^{-1}$ measured using a film of the polar group-containing TPC having a thickness of 20 μm, Ast is a peak intensity at a standard wave number measured using a film of a reference standard (a saturated polyester-based elastomer containing a polyalkylene ether glycol segment in an amount of 65% by mass) having a thickness of 20 μm, and r is a value obtained by dividing a molar fraction of a polyester segment in the polar group-containing TPC by a molar fraction of a polyester segment in the reference standard.]

The method of obtaining a modification amount of the polar group-containing TPC by infrared absorption spectroscopy is as follows. A film-shaped sample having a thickness of 20 μm is dried at 100° C. for 15 hours under reduced pressure to remove unreacted materials, and then an infrared absorption spectrum is measured. The peak height of an absorption peak (using a tangent line connecting feet on both sides of the absorption band in the range of from 1750 to 1820 cm$^{-1}$ as a baseline) at 1786 cm$^{-1}$, which is produced by stretching vibration of a carbonyl group derived from an acid anhydride, is calculated from the resulting spectrum, and is designated as a "peak intensity $A_{1786}$". With respect to a film of a reference standard (a saturated polyester-based elastomer containing a polyalkylene ether glycol segment in an amount of 65% by mass) having a thickness of 20 μm, an infrared absorption spectrum is measured in the same manner. The peak height of a peak at a standard wave number, for example in a case of an aromatic polyester-based elastomer containing a benzene ring, the peak height of an absorption peak (using a tangent line connecting feet on both sides of the absorption band in the range of from 850 to 900 cm$^{-1}$ as a baseline) at 872 cm$^{-1}$, which is produced by out-of-plane deformation vibration of C—H in a benzene ring, is calculated from the resulting spectrum, and is designated as a "peak intensity Ast". The peak at a standard wave number may be selected from peaks which are derived from a hard segment, unaffected by modification, and separated from an absorption peak which can overlap with the peak. From these peak intensities, a modification amount by infrared absorption spectroscopy is calculated according to the formula. In the calculation, as r, a value obtained by dividing the molar fraction of a polyester segment in the polar group-containing TPC of which a modification amount is to be determined by the molar fraction of a polyester segment in the reference standard is used. The molar fraction mr of a polyester segment of each sample is calculated from mass fractions of the polyester segment and the polyalkylene ether glycol segment ($w_1$ and $w_2$) and molecular weights of monomer units ($e_1$ and $e_2$) which configure the segments according to the following formula.

$$mr = (w_1/e_1)/[(w_1/e_1)+(w_2/e_2)]$$

(3) Blending Method

Synthesis of the polar group-containing TPC is performed by, for example, modifying (A) a saturated polyester-based thermoplastic elastomer by B) an unsaturated carboxylic acid or a derivative thereof in the presence of (C) a radical generator. In this reaction, it is preferred that component (A) is used as a molten material because the reaction with component (B) becomes more efficiently, which results in sufficient modification. For example, a method in which component (B) is mixed with a non-molten state of component (A) in advance, and component (A) is melted to react with component (B) is preferably used.

In addition, it is preferred to select a so-called melt kneading using a kneader that can produce a sufficient shearing stress for mixing component (A) with component (B). As a kneader for use in melt kneading, any kneader can be selected from usual kneaders such as a mixing roll, a sigma-type rotary blade kneader, a Banbury mixer, a high-speed twin-screw continuous mixer, a single-, twin-, or multi-screw extrusion kneader. Among these, a twin-screw extruder is preferred because the twin-screw extruder achieves an efficient reaction and a reduced production cost. The melt kneading can be performed after uniformly mixing powdered or granular component (A), component (B), and component (C), and if necessary, an additional component (an optional ingredient) such as component (D) according to a prescribed blending ratio using a Henschel mixer, a ribbon blender, a V-type blender, or the like. The temperature for kneading these components is preferably in a range of from 100° C. to 300° C., more preferably in a range of from 120° C. to 280° C., and particularly preferably from 150° C. to 250° C. in consideration of thermal deterioration decomposition of component (A) and a half-life temperature of component (C). Practically, the optimum kneading temperature is in the range of from a temperature which is 20° C. higher than the melting point of component (A) to the melting point of component (A). The order and method of kneading these components are not particularly limited. Examples of the method include a method in which component (A), component (B), and component (C), and an additional component such as component (D) are kneaded all together, and a method in which some of component (A) to component (C) are kneaded in advance, and the remainder including an additional component such as component (D) are kneaded. When component (C) is added, it is preferred that the component (C) is added together with component (B) and optional component (D) from the viewpoint of improvement in adhesion.

(Physical Properties)

Melting Point

The melting point of the polyester-based thermoplastic elastomer having a polar functional group (polar group-containing TPC) is preferably from 160° C. to 230° C., more preferably from 180° C. to 227° C., and still more preferably from 190° C. to 225° C.

When the melting point is 160° C. or higher, a superior heat resistance to application of heat (e.g., vulcanization) during production of a tire can be achieved. When the melting point is within the range, the melting point is easily made to be close to the melting point of a resin included in the covering resin layer (preferably a polyester-based thermoplastic elastomer), and the close melting points provide a superior adhesion.

The melting point of a polar group-containing TPC refers to a temperature at which a curve obtained by differential scanning calorimetry (DSC) (a DSC curve) forms an endothermic peak. The melting point is measured by a differential scanning calorimeter (DSC) according to JIS K 7121:2012. For example, the measurement can be performed by using "DSC Q100" from TA instruments at scan speed of 10° C./min.

(Other Components)

Examples of other components which can be contained in the continuous phase include a resin component; a rubber component; a filler such as talc, calcium carbonate, mica, or a glass fiber; a plasticizer such as paraffin oil; and various additives such as an antioxidant, a heat stabilizer, a light stabilizer, an ultraviolet absorber, neutralizer, a lubricant, an anti-fogging agent, an anti-blocking agent, a slip agent, a cross-linking reagent, crosslinking aids, colorants, flame retardants, a dispersant, an antistatic agent, an antimicrobial agent, or a fluorescent whitening agent. At least one kind of various antioxidants such as phenol-type, phosphite-type, thioether-type, or aromatic amine-type antioxidants is preferably contained.

(Discontinuous Phase)

The discontinuous phase contains at least a styrene-based elastomer, and if necessary, optionally contains other components.

The content of the styrene-based elastomer with respect to the entirety of the discontinuous phase, is preferably 80% by mass or more, more preferably 90% by mass or more, and still more preferably 95% by mass or more.

The discontinuous phase may contain only one kind of a styrene-based elastomer, or may contain two or more kinds of styrene-based elastomers. When the discontinuous phase contains two or more kinds of styrene-based elastomers, the content refers to the total content of the two or more kinds of styrene-based elastomers.

(Styrene-Based Elastomer)

The styrene-based elastomer is not particularly limited as long as the styrene-based elastomer is an elastomer (i.e., a polymer compound having elasticity) which contains a constituent unit derived from a compound having a styrene skeleton (hereinafter, also referred to as a "styrene component").

Examples of the styrene-based elastomer include a copolymer (a block copolymer or a random copolymer) of styrene and an olefin other than styrene. Examples of the olefin other than styrene include butadiene, isoprene, ethylene, propylene, and butylene.

The styrene-based elastomer may be an unsaturated-type styrene-based elastomer or saturated-type styrene-based elastomer.

Examples of the unsaturated-type styrene-based elastomer include a styrene-butadiene copolymer (e.g., a styrene-butadiene random copolymer or a polystyrene-polybutadiene-polystyrene block copolymer (SBS)); and a styrene-isoprene copolymer (e.g., a styrene-isoprene random copolymer or a polystyrene-polyisoprene-polystyrene block copolymer (SIS)).

Examples of the saturated-type styrene-based elastomer include a styrene-ethylene-butylene copolymer (e.g., a styrene-ethylene-butylene random copolymer or a polystyrene-poly(ethylene-butylene)-polystyrene block copolymer (SEBS)); a styrene-ethylene-propylene copolymer (e.g., a styrene-ethylene-propylene random copolymer, a polystyrene-poly(ethylene-propylene) block copolymer (SEP), a polystyrene-poly(ethylene-propylene)-polystyrene block copolymer (SEPS), or a polystyrene-poly(ethylene-ethylene-propylene)-polystyrene block copolymer (SEEPS)); a styrene-isobutylene copolymer (e.g., a styrene-isobutylene random copolymer, a polystyrene-polyisobutylene block copolymer (SIB), or a polystyrene-polyisobutylene-polystyrene block copolymer (SIBS); and a styrene-ethylene-isoprene copolymer (e.g., a styrene-ethylene-isoprene random copolymer or a polystyrene-poly(ethylene-isoprene)-polystyrene block copolymer (SIPS)).

The saturated-type styrene-based elastomer may be a saturated-type styrene-based elastomer which is obtained by hydrogenation of the unsaturated-type styrene-based elastomer. That is, the saturated-type styrene-based elastomer may be a saturated-type styrene-based elastomer in which at least a part of unsaturated bonds of an olefin component in the unsaturated-type styrene-based elastomer is hydrogenated, and may have an unsaturated bond. Examples of the styrene-ethylene-butylene copolymer include a styrene-ethylene-butylene copolymer which is obtained by hydrogenation of a styrene-butadiene copolymer and a styrene-ethylene-butylene copolymer containing a butadiene component (i.e., containing an unsaturated bond).

The discontinuous phase may contain an unsaturated-type styrene-based elastomer or a saturated-type styrene-based elastomer. The discontinuous phase may contain both an unsaturated-type styrene-based elastomer and a saturated-type styrene-based elastomer.

Examples of the degree of unsaturation of the saturated-type styrene-based elastomer contained in the discontinuous phase include 50% or less, and the degree of unsaturation is, from the viewpoint of reducing deterioration of an adhesive layer, preferably 20% or less, and more preferably 10% or less.

The measurement of the degree of unsaturation is performed by using nuclear magnetic resonance (NMR), and the degree of unsaturation is obtained according to JIS6239:2007, "Styrene-butadiene rubber (SBR)—Determination of the microstructure of solution-polymerized SBR". Specifically, the measurement is carried out using deuterochloroform as a solvent, the integrated value of peaks in a range of from 80 ppm to 145 ppm which correspond to C=C (i.e., a carbon-carbon double bond) and the integrated value of peaks in a range excluding the range of from 80 ppm to 145 ppm are obtained, and the degree of unsaturation is calculated from the obtained values.

Examples of the content of the styrene component with respect to the entirety of the styrene-based elastomer (hereinafter, also referred to as "styrene ratio") include from 5% by mass to 80% by mass, and the styrene ratio is preferably from 7% by mass to 60% by mass, more preferably from 10% by mass to 45% by mass, and particularly preferably from 12% by mass to 43% by mass.

When the styrene ratio is within the range, water barrier properties of the adhesive layer is improved as compared to a case in which the styrene ratio is lower than the range, and flexibility of the adhesive layer is achieved and adhesion durability is improved as compared to a case in which the styrene ratio is higher than the range.

When the discontinuous phase contains two or more kinds of styrene-based elastomers, the styrene ratio refers to a styrene ratio with respect to the entirety of the two or more kinds of styrene-based elastomers. That is, the styrene ratio is a styrene ratio calculated in consideration of the styrene ratio in each styrene-based elastomer and content of the styrene-based elastomer, and refers to a content of a styrene component contained in the entirety of the two or more kinds of styrene-based elastomers.

The measurement of the styrene ratio is carried out using nuclear magnetic resonance (NMR). Specifically, the measurement is carried out using tetrachloroethane as a solvent, the integrated value of peaks in the rage of from 5.5 ppm to 6.5 ppm which corresponds to styrene and integrated value of peaks in a range excluding the range of from 5.5 ppm to 6.5 ppm are obtained, and the styrene ratio is calculated from the obtained values.

The styrene-based elastomer may have a polar functional group. Examples of the polar functional group include the same polar functional groups as those exemplified for the polar functional group contained in the polyester-based thermoplastic elastomer.

When the discontinuous phase contains a styrene-based elastomer having a polar functional group, due to a high compatibility with a polyester-based thermoplastic elastomer having a polar functional group contained in a continuous phase, compatibility between the continuous phase and the discontinuous phase is improved, and adhesion durability is increased.

Particularly, when the polyester-based thermoplastic elastomer of the continuous phase has a carboxy group, from the viewpoint of improving adhesion durability associated with improvement in compatibility between the continuous phase and the discontinuous phase, the polar functional group contained in the styrene-based elastomer is preferably an epoxy group or an amino group, and more preferably an epoxy group.

The discontinuous phase may contain both a styrene-based elastomer which has a polar functional group and a styrene-based elastomer which does not have a polar functional group as styrene-based elastomers, or may contain only one of these elastomers as a styrene-based elastomer.

When the discontinuous phase contains a styrene-based elastomer having an epoxy group as a polar functional group, examples of an epoxy equivalent weight with respect to the entirety of the discontinuous phase (i.e., the number of grams of the entirety of the discontinuous phase that contains 1 mole of an epoxy group) include from 8000 g/eq to 42000 g/eq, and the epoxy equivalent weight is preferably from 9000 g/eq to 30000 g/eq, and more preferably from 9500 g/eq to 25000 g/eq.

The epoxy equivalent weight can be obtained by a method according to JIS K 7236:2001.

Examples of the number-average molecular weight of the styrene-based elastomer include from 5,000 to 1,000,000, and from the viewpoint of compatibility with the continuous phase, the number-average molecular weight is preferably from 10,000 to 800,000, and more preferably from 30,000 to 600,000. Examples of the ratio between the weight-average molecular weight (Mw) and the number-average molecular weight (Mn) (Mw/Mn) include 10 or less.

The number-average molecular weight and the ratio (Mw/Mn) refer to, when the discontinuous phase contains two or more kinds of styrene-based elastomers, a weight-average molecular weight in the entirety of the two or more styrene-based elastomers.

The measurements of the weight-average molecular weight and the number-average molecular weight are performed by gel permeation chromatography (GPC, HLC-8320GPC system manufactured by Tosoh Corporation). The weight-average molecular weight and the number-average molecular weight are obtained under the following conditions: column: TSK-GEL GMHXL (manufactured by Tosoh Corporation), eluent: chloroform (manufactured by Wako Pure Chemical Industries, Ltd), column temperature: 40° C., flow rate: 1 ml/min, and using an FT-IR detector.

The styrene-based elastomer may be a block copolymer or a random copolymer. That is, the discontinuous phase may contain both a block copolymer as a styrene-based elastomer and a random copolymer as a styrene-based elastomer as styrene-based elastomers, or may contain only one of a block copolymer or a random copolymer as a styrene-based elastomer.

When the discontinuous phase contains a block copolymer as a styrene-based elastomer, water barrier properties of an adhesive layer is improved, and wet heat durability of a resin-metal composite member for a tire is improved.

Examples of the block copolymer as a styrene-based elastomer include a material in which at least polystyrene configures a hard segment and another polymer (e.g., polybutadiene, polyisoprene, polyethylene, hydrogenated polybutadiene, or hydrogenated polyisoprene) configures a soft segment which is amorphous and has a low glass transition temperature.

Examples of the polystyrene which configures a hard segment include a polystyrene which can be obtained by a conventionally known radical polymerization, ionic polymerization, or the like, and specific examples include an anionic living polymerized polystyrene.

Examples of the polymer which configures a soft segment include polybutadiene, polyisoprene, and poly(2,3-dimethyl-butadiene).

The number-average molecular weight of the polymer (polystyrene) configuring a hard segment is preferably from 5000 to 500000, and more preferably from 10000 to 200000.

The number-average molecular weight of the polymer configuring a soft segment is preferably from 5000 to 1000000, more preferably from 10000 to 800000, and still more preferably from 30000 to 500000.

The block copolymer as a styrene-based elastomer can be synthesized by, for example, copolymerizing a polymer which configures a hard segment (i.e., polystyrene) and a polymer which configures a soft segment by a conventionally known method.

On the other hand, examples of the method of synthesizing the styrene-based elastomer as a random copolymer include a method using an agent such as a randomizer.

The styrene-based elastomer having a polar functional group can be obtained by, for example, introducing a polar functional group to an unmodified styrene-based elastomer. Specifically, in a case of a styrene-based elastomer having, for example, an epoxy group as a polar functional group, the styrene-based elastomer can be obtained by reacting an unmodified styrene-based elastomer with an epoxidizing agent in the presence of, if necessary, a solvent and a catalyst. Examples of the epoxidizing agent include hydroperoxides such as hydrogen peroxide, tert-butylhydroperoxide, or cumene hydroperoxide; and peracids such as performic acid, peracetic acid, perbenzoic acid, or trifluoroperacetic acid.

(Other Components)

The discontinuous phase may contain other components than the styrene-based elastomer. Examples of the other components include resins other than the styrene-based elastomer, and additives. Examples of the content of the other components with respect to the entirety of the discontinuous phase include 20% by mass or less, and the content is preferably 10% by mass or less, and more preferably 5% by mass or less.

(Properties of Adhesive Layer)

As described above, the ratio of the continuous phase with respect to the entirety of the adhesive layer is from 60% by mass to 93% by mass, preferably from 65% by mass to 90% by mass, more preferably from 70% by mass to 87% by mass, and still more preferably from 70% by mass to 85% by mass.

When the ratio of the continuous phase is within the range, the content of the styrene-based elastomer becomes high as compared to a case in which the ratio is higher than the range, and water barrier properties of the adhesive layer is improved. When the ratio of the continuous phase is within the range, the effect derived from the polyester-based thermoplastic resin having a polar functional group contained in the continuous phase can be easily exerted as compared to a case in which the ratio is lower than the range, and adhesion durability is improved.

The adhesive layer optionally includes other discontinuous phases (e.g., phases of resins other than the polyester-based thermoplastic elastomer and the styrene-based elastomer, and additives) in addition to the continuous phase containing a polyester-based thermoplastic elastomer having a polar functional group and the discontinuous phase containing a styrene-based elastomer. The ratio of the other discontinuous phases with respect to the entirety of the adhesive layer is preferably 10% by mass or less, more preferably 5% by mass or less, and still more preferably 3% by mass or less.

(Physical Properties)

Tensile Elastic Modulus

It is preferred that the adhesive layer is a layer having a tensile elastic modulus that is smaller than that of a covering resin layer. The tensile elastic modulus of the adhesive layer can be controlled by, for example, types of an adhesive used for forming the adhesive layer (a composition for forming the adhesive layer), conditions for the formation of the adhesive layer and thermal history (e.g., heating temperature and heating time).

For example, the lower limit of the tensile elastic modulus of the adhesive layer is preferably 1 MPa or more, more preferably 20 MPa or more, and still more preferably 50 MPa or more. When the tensile elastic modulus is the lower limit or higher, performance of adhesion to metals and durability of a tire are excellent.

The upper limit of the tensile elastic modulus of the adhesive layer is, form the viewpoint of riding comfort, preferably 1500 MPa or less, more preferably 600 MPa or less, and still more preferably 400 MPa or less.

The measurement of the tensile elastic modulus of the adhesive layer can be performed in a method similar to that for the measurement of the tensile elastic modulus of the covering resin layer.

When the tensile elastic modulus of the adhesive layer is denoted by $E_1$ and the tensile elastic modulus of the covering resin layer is denoted by $E_2$, examples of the value of $E_1/E_2$ include from 0.05 to 0.5, and the value of $E_1/E_2$ is preferably from 0.05 to 0.3, and more preferably from 0.05 to 0.2. When the value of $E_1/E_2$ is within the range, durability of a tire is superior as compared to a case in which the value is lower than the range, and riding comfort is superior as compared to a case in which the value is higher than the range.

Thickness

The average thickness of the adhesive layer is preferably, but not limited to, in view of drive comfort and durability of a tire, from 5 µm to 500 µm, more preferably 20 µm to 150 µm, and still more preferably 20 µm to 100 µm.

The average thickness of the adhesive layer refers to a number average thickness of the adhesive layer which is obtained as follows: 5 random sectional SEM images are obtained from cross sections of the resin-metal composite member cut along the layer direction of the metal member, the adhesive layer, and the covering resin layer, and the number average thickness of the adhesive layer is calculated from the obtained SEM images. The thickness of the adhesive layer in each of the SEM images is a thickness measured at the thinnest portion (a portion at which the distance from an interface between the metal member and the adhesive layer to an interface between the adhesive layer and the covering resin layer is smallest).

When the average thickness of the adhesive layer is denoted by $T_1$ and the average thickness of the covering resin layer is denoted by $T_2$, examples of the value of $T_1/T_2$ include from 0.1 to 0.5, and the value is preferably from 0.1 to 0.4, and more preferably from 0.1 to 0.35. When the value of $T_1/T_2$ is within the range, riding comfort is superior as compared to a case in which the value is smaller than the range, and durability of a tire is superior as compared to a case in which the value is larger than the range.

(Covering Resin Layer)

The material of the covering resin layer is not particularly limited, and at least one kind of thermoplastic material selected from the group consisting of a thermoplastic resin and a thermoplastic elastomer can be used.

The covering resin layer preferably contains, from the viewpoint of ease in molding and the viewpoint of adhesion to the adhesive layer, a thermoplastic elastomer.

The covering resin layer desirably contains, in particular, a polyester-based thermoplastic elastomer among thermoplastic elastomers. Since the continuous phase of the adhesive layer contains a polyester-based thermoplastic elastomer having a polar functional group, when the covering resin layer contains a polyester-based thermoplastic elastomer, the covering resin layer has an excellent compatibility between a material for the adhesive layer (an adhesive) and a material for the covering resin layer (a resin). Accordingly, when the surface of the adhesive layer is coated with a resin, the adhesive layer and the resin agree well with each other, which results in a good adhesion between the adhesive layer and the covering resin layer.

(Polyester-Based Thermoplastic Elastomer)

As a polyester-based thermoplastic elastomer contained in the covering resin layer, it is preferred that a polyester-based thermoplastic elastomer which does not have a polar functional group is contained, and more preferred that an unmodified polyester-based thermoplastic elastomer is contained.

When the covering resin layer contains a polyester-based thermoplastic elastomer, it is preferred that 50% by mass or more of the polyester-based thermoplastic elastomer is contained with respect to the entirety of the covering resin layer, and more preferred that 60% by mass or more is contained, and still more preferred that 75% by mass or more is contained.

The polyester-based thermoplastic elastomer is the same as the following polyester-based thermoplastic elastomer for use in a tire frame, and a preferred aspect is also the same. Accordingly, a detailed description thereof is not provided here.

When the covering resin layer contains a polyester-based thermoplastic elastomer, the melting point of the polyester-based thermoplastic elastomer is preferably from 160° C. to 230° C., more preferably from 180° C. to 227° C., and still more preferably from 190° C. to 225° C.

When the melting point is 160° C. or higher, a superior heat resistance to application of heat (e.g., vulcanization) during production of a tire can be achieved. When the melting point is within the range, the melting point is easily made to be close to the melting point of a polyester-based thermoplastic elastomer having a polar functional group contained in the adhesive layer, and the close melting points provide a superior adhesion.

The measurement of the melting point of a polyester-based thermoplastic elastomer contained in the covering resin layer is performed in a method similar to that for the polar group-containing TPC.

(Other Thermoplastic Elastomers)

Examples of other thermoplastic elastomers include a polyamide-based thermoplastic elastomer, a polystyrene-based thermoplastic elastomer, a polyurethane-based thermoplastic elastomer, and an olefin-based thermoplastic elastomer. These thermoplastic elastomers may be used singly, or in combination of two or more kinds thereof.

The polyamide-based thermoplastic elastomer, polystyrene-based thermoplastic elastomer, polyurethane-based thermoplastic elastomer, and olefin-based thermoplastic elastomer are the same as the following thermoplastic elastomers for use in a tire frame, and a preferred aspect is also the same. Accordingly, a detailed description thereof is not provided here.

(Thermoplastic Resin)

Examples of the thermoplastic resin include polyamide-based thermoplastic resins, polyester-based thermoplastic resins, olefin-based thermoplastic resins, polyurethane-based thermoplastic resins, vinyl chloride-based thermoplastic resins, and polystyrene-based thermoplastic resins. These thermoplastic resins may be used singly, or two or more kinds thereof may be used in combination.

—Polyamide-Based Thermoplastic Resin—

Examples of a polyamide-based thermoplastic resin include a polyamide configuring a hard segment of a polyamide-based thermoplastic elastomer used in the below-described tire frame. Specific examples of the polyamide-based thermoplastic resin include a polyamide (Polyamide 6) obtained by ring-opening polycondensation of ε-caprolactam, a polyamide (Polyamide 11) obtained by ring-opening polycondensation of undecanelactam, a polyamide (Polyamide 12) obtained by ring-opening polycondensation of lauryl lactam, a polyamide (Polyamide 66) obtained by polycondensation of a diamine and a dibasic acid, and a polyamide (Amide MX) containing meta-xylene diamine as a structural unit.

Amide 6 can be represented by, for example, $\{CO-(CH_2)_5-NH\}n$; Amide 11 can be represented by, for example, $\{CO-(CH_2)_{10}-NH\}_n$; Amide 12 can be represented by, for example, $\{CO-(CH_2)_{11}-NH\}_n$; Amide 66 can be represented by, for example, $\{CO(CH_2)_4CONH(CH_2)_6NH\}_n$; and Amide MX can be represented by, for example, the below-described Formula (A-1), wherein n represents the number of repeating units.

As a commercially available product of Amide 6, for example, "UBE NYLON" Series (e.g., 1022B and 1011FB) manufactured by Ube Industries, Ltd. can be used. As a commercially available product of Amide 11, for example, "RILSAN B" Series manufactured by Arkema K. K. can be used. As a commercially available product of Amide 12, for example, "UBE NYLON" Series (e.g., 3024U, 3020U, and 3014U) manufactured by Ube Industries, Ltd. can be used. As a commercially available product of Amide 66, for example, "UBE NYLON" Series (e.g., 2020B and 2015B) manufactured by Ube Industries, Ltd. can be used. As a commercially available product of Amide MX, for example, "MX NYLON" Series (e.g., S6001, S6021, and S6011) manufactured by Mitsubishi Gas Chemical Co., Inc. can be used.

(A-1)

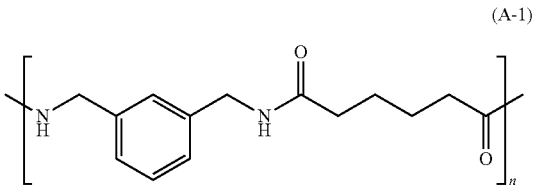

The polyamide-based thermoplastic resin may be a homopolymer consisting of only the above-described structural unit, or a copolymer of the above-described structural unit and other monomer. In the case of a copolymer, the content of the structural unit in each polyamide-based thermoplastic resin is preferably 40% by mass or higher.

—Polyester-Based Thermoplastic Resin—

Examples of a polyester-based thermoplastic resin include a polyester configuring a hard segment of a polyester-based thermoplastic elastomer used in the below-described tire frame.

Specific examples of the polyester-based thermoplastic resin include aliphatic polyesters such as polylactic acid, polyhydroxy-3-butyl butyrate, polyhydroxy-3-hexyl butyrate, poly(ε-caprolactone), polyenantholactone, polycaprylolactone, polybutylene adipate, and polyethylene adipate; and aromatic polyesters such as polyethylene terephthalate, polybutylene terephthalate, polyethylene naphthalate, and polybutylene naphthalate. Thereamong, from the standpoints of heat resistance and processability, polybutylene terephthalate is preferable as the polyester-based thermoplastic resin.

As a commercially available product of the polyester-based thermoplastic resin, for example, "DURANEX" Series (e.g., 2000 and 2002) manufactured by Polyplastics Co., Ltd., "NOVADURAN" Series (e.g., 5010R5 and 5010R3-2) manufactured by Mitsubishi Engineering-Plastics Corporation, and "TORAYCON" Series (e.g., 1401X06 and 1401X31) manufactured by Toray Industries, Inc., can be used.

—Olefin-Based Thermoplastic Resin—

Examples of an olefin-based thermoplastic resin include a polyolefin configuring a hard segment of an olefin-based thermoplastic elastomer used in the below-described tire frame.

Specific examples of the olefin-based thermoplastic resin include polyethylene-based thermoplastic resins, polypropylene-based thermoplastic resins, and polybutadiene-based thermoplastic resins. Thereamong, from the standpoints of heat resistance and processability, a polypropylene-based thermoplastic resin is preferable as the olefin-based thermoplastic resin.

Specific examples of the polypropylene-based thermoplastic resin include propylene homopolymers, propylene-α-olefin random copolymers, propylene-α-olefin block copolymers. Examples of the α-olefin include α-olefins having from about 3 to about 20 carbon atoms, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, and 1-eicosene.

The covering resin layer may contain other components than the thermoplastic resin and the thermoplastic elastomer. Examples of the other components include rubber, a thermoplastic resin, various fillers (e.g., silica, calcium carbonate, and clay), an anti-aging agent, an oil, a plasticizer, a color former, and a weathering agent.

(Physical Properties)

Thickness

The average thickness of the covering resin layer is not particularly limited. From the viewpoint of superior durability and weldability, the thickness is preferably from 10 μm to 1000 μm, and more preferably from 50 μm to 700 μm.

The average thickness of the covering resin layer refers to a number average thickness which is obtained as follows: 5 random sectional SEM images are obtained from cross sections of resin-metal composite member cut along the layer direction of the metal member, the adhesive layer, and the covering resin layer, and the number average thickness of the covering resin layer is calculated from the obtained SEM images or images obtained with a video microscope. The thickness of the covering resin layer in each of the SEM images is a thickness measured at the thinnest portion (a portion at which the distance from an interface between the adhesive layer and the covering resin layer to the outer edge of the resin-metal composite member is smallest).

Tensile Elastic Modulus

It is preferred that the tensile elastic modulus of the covering resin layer is larger than the tensile elastic modulus of the adhesive layer. Examples of the tensile elastic modulus of the covering resin layer include from 50 MPa to 1000 MPa, and from the viewpoint of riding comfort and running performance, the tensile elastic modulus of the covering resin layer is preferably from 50 MPa to 800 MPa, and more preferably from 50 MPa to 700 MPa.

The tensile elastic modulus of the covering resin layer can be controlled by, for example, types of resins contained in the covering resin layer.

The measurement of the tensile elastic modulus is performed according to JIS K7113:1995.

Specifically, the measurement of the tensile elastic modulus is performed using a Shimadzu Autograph AGS-J (5KN) manufactured by SHIMADZU CORPORATION with a tensile speed setting of 100 mm/min. When the tensile elastic modulus of a covering resin layer contained in a resin-metal composite member is measured, another test sample may be prepared from the identical material of the covering resin layer, and measurement of elastic modulus may be performed.

<Tire>

The tire according to one embodiment of the present disclosure has a circular tire frame including an elastic material and the resin-metal composite member for a tire.

The resin-metal composite member for a tire is used as, for example, a reinforcing belt member which is wound around an outer circumferential portion of a tire frame in a circumferential direction, or a bead member.

The tire frame which configures a tire is described herein below.

(Tire Frame)

The tire frame is formed of an elastic material. Examples of the tire frame include a tire frame which is formed of a rubber material as the elastic material (a so-called tire frame for a rubber tire), and a tire frame which is formed of a resin material as the elastic material (a so-called tire frame for a resin tire).

(Elastic Material: Rubber Material)

The rubber material contains at least rubber (a rubber component), and optionally includes other components such as additives as long as the effects of the disclosure is not impaired. The content of rubber (a rubber component) in the rubber material is preferably 50% by mass or more, and more preferably 90% by mass or more with respect to the total amount of the rubber material. The tire frame can be formed, for example, using the rubber material.

The rubber component for use in the tire frame is not particularly limited, and hitherto known natural rubber and various kinds of synthetic rubbers which are used in rubber formulations can be used singly or in combination of two or more kinds thereof. For example, the following rubbers or rubber blends of two or more kinds thereof can be used.

As the natural rubber, either sheet rubber or block rubber may be used, and any of RSS #1 to #5 may be used.

As the synthetic rubber, for example, various diene-based synthetic rubbers, diene-based copolymer rubbers, special rubbers, and modified rubbers can be used. Specific examples include butadiene-based polymers such as polybutadiene (BR), copolymers of butadiene and an aromatic vinyl compound (e.g., SBR and NBR), or copolymers of butadiene and other diene-type compounds; isoprene-based polymers such as polyisoprene (IR), copolymers of isoprene and an aromatic vinyl compound, or copolymers of isoprene and other diene-type compounds; chloroprene rubber (CR), butyl rubber (IIR), and halogenated butyl rubber (X-IIR); and ethylene-propylene-based copolymer rubbers (EPM) and ethylene-propylene-diene-based copolymer rubber (EPDM); and any blends thereof.

In the rubber material for use in a tire frame, other components such as additives may be added to the rubber depending on purposes.

Examples of additives include a reinforcing material such as carbon black, fillers, vulcanizing agents, vulcanizing accelerators, fatty acids or salts thereof, metal oxides, process oils, and anti-aging agents, and these additives may be added, if appropriate.

The tire frame formed of a rubber material can be obtained by forming an unvulcanized rubber material, in which the rubber contained is in an unvulcanized state, into a tire-frame shape, and vulcanizing the rubber by heating.

(Elastic Material: Resin Material)

The resin material contains at least a resin (a resin component), and optionally includes other components such as additives as long as the effects of the disclosure is not impaired. The content of the resins (a resin component) in the resin material is preferably 50% by mass or more, and more preferably 90% by mass or more with respect to the total amount of the resin material. The tire frame can be formed using the resin material.

Examples of the resin contained in the tire frame include thermoplastic resins, thermoplastic elastomers, and thermosetting resins. From the viewpoint of drive comfort, the resin material preferably contains a thermoplastic elastomer, and more preferably contains a polyamide-based thermoplastic elastomer. From the viewpoint of adhesion, the tire frame preferably contains the same kinds of material as the resin contained in the covering resin layer of the resin-metal composite member (i.e., a thermoplastic resins or a thermoplastic elastomers). That is, when the covering resin layer of the resin-metal composite member contains a polyester-based thermoplastic elastomer, the tire frame preferably contains at least one of a polyester-based thermoplastic resin or a polyester-based thermoplastic elastomer.

Examples of the thermosetting resin include phenol-based thermosetting resins, urea-based thermosetting resins, melamine-based thermosetting resins, and epoxy-based thermosetting resins.

Examples of the thermoplastic resin include polyamide-based thermoplastic resins, polyester-based thermoplastic resins, olefin-based thermoplastic resins, polyurethane-based thermoplastic resins, vinyl chloride-based thermoplastic resins, and polystyrene-based thermoplastic resins. These thermoplastic resins may be used singly, or in combination of two or more kinds thereof. Among these, as the thermoplastic resin, at least one kind selected from polyamide-based thermoplastic resins, polyester-based thermoplastic resins, and olefin-based thermoplastic resins is preferred, and at least one kind selected from polyamide-based thermoplastic resins and olefin-based thermoplastic resins is more preferred. The polyamide-based thermoplastic resins, polyester-based thermoplastic resins, and olefin-based thermoplastic resins as described herein are the same as the aforementioned polyamide-based thermoplastic resins, polyester-based thermoplastic resins, and olefin-based thermoplastic resins used in the covering resin layer.

Examples of the thermoplastic elastomer include polyamide-based thermoplastic elastomers (TPA), polystyrene-based thermoplastic elastomers (TPS), polyurethane-based thermoplastic elastomers (TPU), olefin-based thermoplastic elastomers (TPO), polyester-based thermoplastic elastomers (TPEE), thermoplastic rubber vulcanizates (TPV), and other thermoplastic elastomers (TPZ), all of which are defined in JIS K6418. Taking into consideration the elasticity required during traveling as well as the moldability in the production and the like, it is preferable to use a thermoplastic resin, and it is more preferable to use a thermoplastic elastomer, as the resin material forming the tire frame.

—Polyamide-Based Thermoplastic Elastomer—

The term "polyamide-based thermoplastic elastomer" means a thermoplastic resin material composed of a copolymer that contains a polymer configuring a crystalline and high-melting-point hard segment and a polymer configuring an amorphous and low-glass-transition-temperature soft segment, wherein the polymer configuring the hard segment has an amide bond (—CONH—) in its main chain.

Examples of the polyamide-based thermoplastic elastomer include materials in which at least a polyamide configures a crystalline and high-melting-point hard segment and other polymer (e.g., a polyester or a polyether) configures an amorphous and low-glass-transition-temperature soft segment. Further, the polyamide-based thermoplastic elastomer may be composed of, in addition to a hard segment and a soft segment, a chain extender such as a dicarboxylic acid.

Specific examples of the polyamide-based thermoplastic elastomer include amide-based thermoplastic elastomers (TPA) that are defined in JIS K6418:2007, and polyamide-based elastomers described in JP-A No. 2004-346273.

In the polyamide-based thermoplastic elastomer, the polyamide configuring the hard segment is, for example, a polyamide formed from a monomer represented by the following Formula (1) or (2).

$$H_2N—R^1—COOH \quad (1)$$

In the above Formula (1), $R^1$ represents a hydrocarbon molecular chain having from 2 to 20 carbon atoms (e.g., an alkylene group having from 2 to 20 carbon atoms).

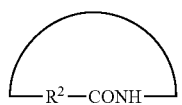
(2)

In the above Formula (2), $R^2$ represents a hydrocarbon molecular chain having from 3 to 20 carbon atoms (e.g., an alkylene group having from 3 to 20 carbon atoms).

In Formula (1), $R^1$ is preferably a hydrocarbon molecular chain having from 3 to 18 carbon atoms (e.g., an alkylene group having from 3 to 18 carbon atoms), more preferably a hydrocarbon molecular chain having from 4 to 15 carbon atoms (e.g., an alkylene group having from 4 to 15 carbon atoms), particularly preferably a hydrocarbon molecular chain having from 10 to 15 carbon atom (e.g., an alkylene group having from 10 to 15 carbon atoms).

In Formula (2), $R^2$ is preferably a hydrocarbon molecular chain having from 3 to 18 carbon atoms (e.g., an alkylene group having from 3 to 18 carbon atoms), more preferably a hydrocarbon molecular chain having from 4 to 15 carbon atom (e.g., an alkylene group having from 4 to 15 carbon atoms), particularly preferably a hydrocarbon molecular chain having from 10 to 15 carbon atoms (e.g., an alkylene group having from 10 to 15 carbon atoms).

Examples of the monomer represented by Formula (1) or (2) include ω-aminocarboxylic acids and lactams. Examples of the polyamide configuring the hard segment include polycondensates of an ω-aminocarboxylic acid or a lactam, and copolycondensates of a diamine and a dicarboxylic acid.

Examples of the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having from 5 to 20 carbon atoms, such as lauryl lactam, ε-caprolactam, undecanelactam, ω-enantholactam, and 2-pyrrolidone.

Examples of the diamine include aliphatic diamines having from 2 to 20 carbon atoms, and aromatic diamines having from 6 to 20 carbon atoms. Examples of the aliphatic diamines having from 2 to 20 carbon atoms and the aromatic diamines having from 6 to 20 carbon atoms include ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, 3-methylpentamethylenediamine, and meta-xylene diamine.

The dicarboxylic acid can be represented by HOOC—$(R^3)_m$—COOH ($R^3$: a hydrocarbon molecular chain having from 3 to 20 carbon atoms, m: 0 or 1), and examples thereof include aliphatic dicarboxylic acids having from 2 to 20 carbon atoms, such as oxalic acid, succinic acid, glutaric acid, adipic acid, pimelic acid, suberic acid, azelaic acid, sebacic acid, and dodecanedioic acid.

As the polyamide configuring the hard segment, a polyamide obtained by ring-opening polycondensation of lauryl lactam, ε-caprolactam or undecanelactam can be preferably used.

Examples of the polymer which configures the soft segment include a polyester, and a polyether, and specifically, polyethylene glycol, polypropylene glycol, poly(tetramethylene ether) glycol, and an ABA-type triblock polyether. These may be used singly or in a combination of two or more kinds thereof. Further, a polyetherdiamine obtained by reacting ammonia or the like with the end of a polyether may be also used.

In this regard, the "ABA-type triblock polyether" means a polyether expressed by the following Formula (3).

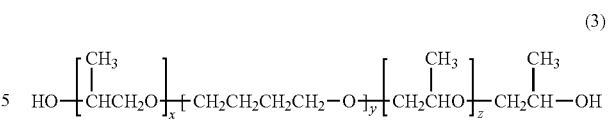

In the above Formula (3), x and z each represent an integer from 1 to 20. y represents an integer from 4 to 50.

In Formula (3), x and z are each preferably an integer from 1 to 18, more preferably an integer from 1 to 16, especially preferably an integer from 1 to 14, and most preferably an integer from 1 to 12. Further, in Formula (3), y is preferably an integer from 5 to 45, more preferably an integer from 6 to 40, especially preferably an integer from 7 to 35, and most preferably an integer from 8 to 30.

Examples of a combination of the hard segment and the soft segment include the combinations of the respective hard segment and the respective soft segment described above. Among them, as the combination of the hard segment and the soft segment, a combination of a ring-opening polycondensate of lauryl lactam and poly(ethylene glycol), a combination of a ring-opening polycondensate of lauryl lactam and poly(propylene glycol), a combination of a ring-opening polycondensate of lauryl lactam and poly(tetramethylene ether) glycol, and a combination of a ring-opening polycondensate of lauryl lactam and an ABA-type triblock polyether are preferable, and a combination of a ring-opening polycondensate of lauryl lactam and an ABA type triblock polyether is especially preferable.

From the standpoint of the melt-moldability, the number-average molecular weight of the polymer (polyamide) configuring the hard segment is preferably from 300 to 15,000. Meanwhile, from the standpoints of the toughness and the low-temperature flexibility, the number-average molecular weight of the polymer configuring the soft segment is preferably from 200 to 6,000. Further, from the standpoint of the moldability, a mass ratio (x:y) of a hard segment (x) and a soft segment (y) is preferably from 50:50 to 90:10, more preferably from 50:50 to 80:20.

The polyamide-based thermoplastic elastomer can be synthesized by copolymerizing the polymer for configuring the hard segment and the polymer for configuring the soft segment by a publicly known method.

As a commercial product for the polyamide-based thermoplastic elastomer, for example, "UBE STA XPA" series (for example, XPA9063X1, XPA9055X1, XPA9048X2, XPA9048X1, XPA9040X1, XPA9040X2, XPA9044) from UBE Industries, Ltd., "VESTAMID" series (for example, E40-S3, E47-S1, E47-S3, E55-S1, E55-S3, EX9200, and E50-R2), from Daicel-Evonik Ltd., or the like may be used.

The polyamide-based thermoplastic elastomer is suitable as a resin material since it satisfies the performances required for a tire frame in terms of elastic modulus (flexibility), strength and the like. In addition, the polyamide-based thermoplastic elastomer often exhibits favorable adhesion with a thermoplastic resin and favorable adhesion with a thermoplastic elastomer.

—Polystyrene-Based Thermoplastic Elastomer—

Examples of the polystyrene-based thermoplastic elastomer include a material in which at least polystyrene configures a hard segment, and another polymer (for example, polybutadiene, polyisoprene, polyethylene, hydrogenated polybutadiene, and hydrogenated polyisoprene) configures an amorphous soft segment with a low glass transition temperature. As the polystyrene which configures the hard segment, for example, one obtained by a publicly known method, such as a radical polymerization method or an ionic polymerization method, is favorably used, and one of specific examples is an anionic living polymerized polystyrene. Examples of a polymer configuring the soft segment include polybutadiene, polyisoprene, and poly(2,3-dimethylbutadiene).

Examples of a combination of the hard segment and the soft segment include the combinations of the respective hard segment and the respective soft segment described above. Among them, as the combination of the hard segment and the soft segment, a combination of polystyrene and polybutadiene, or a combination of polystyrene and polyisoprene is preferable. Further, the soft segment is preferably hydrogenated, so as to suppress unintended crosslinking of a thermoplastic elastomer.

The number average molecular weight of the polymer (polystyrene) configuring the hard segment is preferably from 5,000 to 500,000, and more preferably from 10,000 to 200,000.

Meanwhile, the number average molecular weight of the polymer configuring the soft segment is preferably from 5,000 to 1,000,000, more preferably from 10,000 to 800,000, and especially preferably from 30,000 to 500,000. Further, the volume ratio (x:y) of a hard segment (x) to a soft segment (y) is preferably from 5:95 to 80:20, and more preferably from 10:90 to 70:30, from a viewpoint of formability.

The polystyrene-based thermoplastic elastomer can be synthesized by copolymerizing the polymer for configuring the hard segment and the polymer for configuring the soft segment by a publicly known method.

Examples of the polystyrene-based thermoplastic elastomer include a styrene-butadiene-based copolymer [SBS (polystyrene-poly(butylene) block-polystyrene), SEBS (polystyrene-poly(ethylene/butylene) block-polystyrene)], a styrene-isoprene copolymer (polystyrene-polyisoprene block-polystyrene), a styrene-propylene-based copolymer [SEP (polystyrene-(ethylene/propylene) block), SEPS (polystyrene-poly(ethylene/propylene) block-polystyrene), SEEPS (polystyrene-poly(ethylene-ethylene/propylene) block-polystyrene), and SEB (polystyrene (ethylene/butylene) block)].

As a commercial product for the polystyrene-based thermoplastic elastomer, for example, "TUFTEC" series (for example, H1031, H1041, H1043, H1051, H1052, H1053, H1062, H1082, H1141, H1221, and H1272) produced by Asahi Kasei Corporation, and "SEBS" series (8007, 8076, etc.), "SEPS" series (2002, 2063, etc.), etc. produced by Kuraray Co., Ltd. may be used.

—Polyurethane-Based Thermoplastic Elastomer—

With respect to the polyurethane-based thermoplastic elastomer, for example, there is a material in which at least polyurethane configures a hard segment with pseudo-crosslinks formed by physical aggregation, and another polymer configures an amorphous soft segment with a low glass transition temperature.

Specific examples of the polyurethane-based thermoplastic elastomer include a polyurethane-based thermoplastic elastomer (TPU) as defined according to JIS K6418: 2007. A polyurethane-based thermoplastic elastomer can be expressed as a copolymer including a soft segment containing a unit structure expressed by the following Formula A, and a hard segment containing a unit structure expressed by the following Formula B.

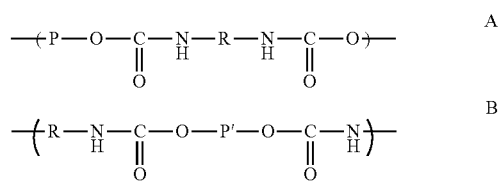

In the above Formulas, P represents a long-chain aliphatic polyether or a long-chain aliphatic polyester. R represents an aliphatic hydrocarbon, an alicyclic hydrocarbon, or an aromatic hydrocarbon. P' represents a short chain aliphatic hydrocarbon, an alicyclic hydrocarbon, or an aromatic hydrocarbon.

As the long-chain aliphatic polyether or the long-chain aliphatic polyester expressed by P in Formula A, for example, that with a molecular weight of from 500 to 5,000 may be used. P is originated from a diol compound containing a long-chain aliphatic polyether or a long-chain aliphatic polyester expressed as P. Examples of such a diol compound include polyethylene glycol, polypropylene glycol, poly(tetramethylene ether) glycol, poly(butylene adipate) diol, poly-ε-caprolactone diol, poly(hexamethylene carbonate) diol, and an ABA-type triblock polyether, molecular weight of which being within the above range.

These may be used singly or in a combination of two or more kinds thereof.

In Formulae A and B, R is a partial structure that is introduced using a diisocyanate compound containing the aliphatic, alicyclic or aromatic hydrocarbon represented by R. Examples of the aliphatic diisocyanate compound containing the aliphatic hydrocarbon represented by R include 1,2-ethylene diisocyanate, 1,3-propylene diisocyanate, 1,4-butane diisocyanate, and 1,6-hexamethylene diisocyanate.

Examples of the diisocyanate compound containing the alicyclic hydrocarbon represented by R include 1,4-cyclohexane diisocyanate and 4,4-cyclohexane diisocyanate. Further, Examples of the aromatic diisocyanate compound containing the aromatic hydrocarbon represented by R include 4,4'-diphenylmethane diisocyanate and tolylene diisocyanate.

These diisocyanate compounds may be used singly, or two or more kinds thereof may be used in combination.

As the short chain aliphatic hydrocarbon, the alicyclic hydrocarbon, or the aromatic hydrocarbon expressed by P' in Formula B, for example, that having a molecular weight of smaller than 500 may be used. P' is originated from a diol compound containing a short chain aliphatic hydrocarbon, an alicyclic hydrocarbon, or an aromatic hydrocarbon expressed by P'. Examples of the aliphatic diol compound containing a short chain aliphatic hydrocarbon expressed by P' include glycol, and a polyalkylene glycol, and specifically include ethylene glycol, propylene glycol, trimethylene glycol, 1,4-butanediol, 1,3-butanediol, 1,5-pentane diol, 1,6-hexane diol, 1,7-heptane diol, 1,8-octane diol, 1,9-nonane diol, and 1,10-decane diol.

Examples of the alicyclic diol compound containing an alicyclic hydrocarbon expressed by P' include cyclopentane-1,2-diol, cyclohexane-1,2-diol, cyclohexane-1,3-diol, cyclohexane-1,4-diol, and cyclohexane-1,4-dimethanol.

Further, examples of the aromatic diol compound containing an aromatic hydrocarbon expressed by P' include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenyl sulfone, 4,4'-dihydroxybenzophenone, 4,4'-dihydroxydiphenyl methane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These may be used singly or in a combination of two or more kinds thereof.

From the standpoint of the melt-moldability, the number-average molecular weight of the polymer (polyurethane) configuring the hard segment is preferably from 300 to 1,500. Meanwhile, from the standpoints of the flexibility and thermal stability of the polyurethane-based thermoplastic elastomer, the number-average molecular weight of the polymer configuring the soft segment is preferably from 500 to 20,000, more preferably from 500 to 5,000, particularly preferably from 500 to 3,000. Further, from the standpoint of the moldability, a mass ratio (x:y) of a hard segment (x) and a soft segment (y) is preferably from 15:85 to 90:10, more preferably from 30:70 to 90:10.

The polyurethane-based thermoplastic elastomer can be synthesized by copolymerizing the polymer for configuring the hard segment and the polymer for configuring the soft segment by a publicly known method. As the polyurethane-based thermoplastic elastomer, for example, a thermoplastic polyurethane described in JP-A No. H05-331256 can be used.

As the polyurethane-based thermoplastic elastomer, specifically, a combination of a hard segment composed of an aromatic diol and an aromatic diisocyanate and a soft segment composed of a polycarbonate ester is preferable, and more specifically at least one kind selected from the group consisting of a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenyl methane diisocyanate (MDI)/polyester-based polyol copolymer, a MDI/polyether-based polyol copolymer, a MDI/caprolactone-based polyol copolymer, a MDI/polycarbonate-based polyol copolymer, and a MDI+hydroquinone/poly(hexamethylene carbonate) copolymer is preferable, and at least one kind selected from the group consisting of a TDI/polyester-based polyol copolymer, a TDI/polyether-based polyol copolymer, a MDI/polyester polyol copolymer, a MDI/polyether-based polyol copolymer, and a MDI+hydroquinone/poly(hexamethylene carbonate) copolymer is more preferable.

As a commercial product for the polyurethane-based thermoplastic elastomer, for example, "ELASTOLLAN" series (for example, ET680, ET880, ET690, and ET890) produced by BASF SE, "KURAMILON U" series (for example, 2000s, 3000s, 8000s, and 9000s) produced by Kuraray Co., Ltd., and "MIRACTRAN" series (for example, XN-2001, XN-2004, P390RSUP, P480RSUI, P26MRNAT, E490, E590, and P890) produced by Nippon Miractran Co., Ltd. may be used.

—Olefin-Based Thermoplastic Elastomer—

Examples of the olefin-based thermoplastic elastomer include a material in which at least a polyolefin configures a crystalline hard segment with a high melting temperature, and another polymer (for example, polyolefin, another polyolefin, and polyvinyl compound) configures an amorphous soft segment with a low glass transition temperature. Examples of the polyolefin configuring a hard segment include polyethylene, polypropylene, isotactic polypropylene, and polybutene.

Examples of the olefin-based thermoplastic elastomer include an olefin-α-olefin random copolymer and an olefin block copolymer, and specifically include a propylene block copolymer, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methylpentene copolymer, an ethylene-1-butene copolymer, a 1-butene-1-hexene copolymer, 1-butene-4-methylpentene, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, and a propylene-vinyl acetate copolymer.

Among them, as the olefin-based thermoplastic elastomer, at least one kind selected from the group consisting of a propylene block copolymer, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methylpentene copolymer, an ethylene-1-butene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, and a propylene-vinyl acetate copolymer is preferable, and at least one kind selected from the group consisting of an ethylene-propylene copolymer, a propylene-1-butene copolymer, an ethylene-1-butene copolymer, an ethylene-methyl methacrylate copolymer, an ethylene-methyl acrylate copolymer, an ethylene-ethyl acrylate copolymer, and an ethylene-butyl acrylate copolymer is more preferable.

A combination of two or more kinds of the olefin-based resins, such as ethylene and propylene, may be used. The content of an olefin-based resin in an olefin-based thermoplastic elastomer is preferably from 50 mass-% to 100 mass-%.

The number average molecular weight of the olefin-based thermoplastic elastomer is preferably from 5,000 to 10,000,000. When the number average molecular weight of the olefin-based thermoplastic elastomer is from 5,000 to 10,000,000, the mechanical properties of a thermoplastic resin material can be adequate, and processability thereof is also superior. From a similar viewpoint, the number average molecular weight of an olefin-based thermoplastic elastomer is more preferably from 7,000 to 1,000,000, and especially preferably from 10,000 to 1,000,000. In this case, the mechanical properties and processability of the thermoplastic resin material can be further improved. Meanwhile, the number average molecular weight of the polymer configuring the soft segment is preferably from 200 to 6,000 from viewpoints of toughness and low temperature flexibility. Further, the mass ratio (x:y) of a hard segment (x) to a soft segment (y) is preferably from 50:50 to 95:15, and more preferably from 50:50 to 90:10, from a viewpoint of formability.

An olefin-based thermoplastic elastomer can be synthesized through copolymerization by a publicly known method.

As an olefin-based thermoplastic elastomer, a thermoplastic elastomer modified with an acid may be used.

An "olefin-based thermoplastic elastomer modified with an acid" means an olefin-based thermoplastic elastomer to which an unsaturated compound having an acidic group, such as a carboxylic acid group, a sulfuric acid group, or a phosphoric acid group, is bound.

The binding of the unsaturated compound having an acidic group, such as a carboxylic acid group, a sulfuric acid group, or a phosphoric acid group, to the olefin-based thermoplastic elastomer may be, for example, binding (e.g., graft polymerization) of an unsaturated bond moiety of an unsaturated carboxylic acid (generally maleic anhydride) as the unsaturated compound having an acidic group to the olefin-based thermoplastic elastomer.

From the standpoint of inhibiting deterioration of the olefin-based thermoplastic elastomer, the unsaturated compound having an acidic group is preferably an unsaturated compound having a carboxylic acid group, which is a weak acid group. Examples of the unsaturated compound having a carboxylic acid group include acrylic acid, methacrylic acid, itaconic acid, crotonic acid, isocrotonic acid, and maleic acid.

As a commercial product for the olefin-based thermoplastic elastomer, for example, "TAFMER" series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680) produced by Mitsui Chemicals, Inc., "NUCREL" series (for example, AN4214C, AN4225C, AN42115C, N0903HC, N0908C, AN42012C, N410, N1050H, N1108C, N1110H, N1207C, N1214, AN4221C, N1525, N1560, N0200H, AN4228C, AN4213C, and N035C), and "ELV-ALOY AC" series (for example, 1125AC, 1209AC, 1218AC, 1609AC, 1820AC, 1913AC, 2112AC, 2116AC, 2615AC, 2715AC, 3117AC, 3427AC, and 3717AC), produced by Dupont-Mitsui Polychemicals Co., Ltd., "ACRYFT" series, "EVATATE" series, etc. from Sumitomo Chemical Co., Ltd., "ULTRATHENE" series, etc. produced by Tosoh Corporation, "PRIME TPO" series (for example, E-2900H, F-3900H, E-2900, F-3900, J-5900, E-2910, F-3910, J-5910, E-2710, F-3710, J-5910, E-2740, F-3740, R110MP, R110E, T310E, and M142E) produced by Prime Polymer Co., Ltd., etc. may be used.

—Polyester-Based Thermoplastic Elastomer—

Examples of the polyester-based thermoplastic elastomer include a material in which at least a polyester configures a crystalline hard segment with a high melting temperature, and another polymer (for example, polyester, or polyether) configures an amorphous soft segment with a low glass transition temperature.

As the polyester configuring the hard segment, an aromatic polyester can be used. The aromatic polyester can be formed from, for example, an aromatic dicarboxylic acid or an ester-forming derivative thereof, and an aliphatic diol. The aromatic polyester is preferably a polybutylene terephthalate derived from 1,4-butanediol and at least one of terephthalic acid or dimethyl terephthalate. Alternatively, the aromatic polyester may be, for example, a polyester derived from a dicarboxylic acid component (e.g., isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative of these dicarboxylic acids) and a diol having a molecular weight of 300 or less (e.g., an aliphatic diol, such as ethylene glycol, trimethylene glycol, pentamethylene glycol, hexamethylene glycol, neopentyl glycol, or decamethylene glycol; an alicyclic diol, such as 1,4-cyclohexane dimethanol or tricyclodecane dimethylol; and an aromatic diol, such as xylylene glycol, bis(p-hydroxy)diphenyl, bis(p-hydroxyphenyl)propane, 2,2-bis[4-(2-hydroxyethoxy)phenyl]propane, bis[4-(2-hydroxy) phenyl]sulfone, 1,1-bis[4-(2-hydroxyethoxy)phenyl]cyclohexane, 4,4'-dihydroxy-p-terphenyl, or 4,4'-dihydroxy-p-quaterphenyl), or a copolyester obtained by using two or more of the above-described dicarboxylic acid components and diol components. It is also possible to copolymerize, for example, a polyfunctional carboxylic acid component, a polyfunctional oxyacid component or a polyfunctional hydroxy component, which has three or more functional groups, in a range of 5% by mole or less.

Examples of the polyester configuring the hard segment include polyethylene terephthalate, polybutylene terephthalate, polymethylene terephthalate, polyethylene naphthalate, and polybutylene naphthalate, among which polybutylene terephthalate is preferable.

Examples of the polymer configuring the soft segment include, an aliphatic polyester and an aliphatic polyether.

Examples of the aliphatic polyether include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide addition polymer of poly(propylene oxide) glycol, and a copolymer of ethylene oxide and tetrahydrofuran.

Examples of the aliphatic polyester include poly(ε-caprolactone), polyenantholactone, polycaprylolactone, poly (butylene adipate), and poly(ethylene adipate).

Among the aliphatic polyethers and the aliphatic polyesters, as the polymer configuring the soft segment, poly (tetramethylene oxide) glycol, an ethylene oxide addition product of poly(propylene oxide) glycol, poly(ε-caprolactone), poly(butylene adipate), and poly(ethylene adipate), and the like are preferable from a viewpoint of the elasticity characteristic of an obtained polyester block copolymer.

The number average molecular weight of the polymer configuring the soft segment is preferably from 300 to 6,000 from viewpoints of toughness and low temperature flexibility. Further, the mass ratio (x:y) of a hard segment (x) to a soft segment (y) is preferably from 99:1 to 20:80 from a viewpoint of formability, and more preferably from 98:2 to 30:70.

Examples of a combination of the hard segment and the soft segment include the combinations of the respective hard segment and the respective soft segment described above. Among them, as the combination of the hard segment and the soft segment, a combination of poly(butylene terephthalate) as a hard segment and an aliphatic polyether as a soft segment is preferable, and a combination of poly(butylene terephthalate) as a hard segment and poly(ethylene oxide) glycol as a soft segment is more preferable.

As a commercial product for the polyester-based thermoplastic elastomer, for example, "HYTREL" series (for example, 3046, 5557, 6347, 4047, and 4767) from Du Pont-Toray Co., Ltd., and "PELPRENE" series (for example, P30B, P40B, P40H, P55B, P70B, P150B, P280B, P450B, P150M, 51001, 52001, 55001, 56001, and 59001) produced by Toyobo Co., Ltd. may be used.

The polyester-based thermoplastic elastomer can be synthesized by copolymerizing the polymer for configuring the hard segment and the polymer for configuring the soft segment by a publicly known method.

—Other Components—

The elastic material (e.g., a rubber material or a resin material) may also contain a component other than a rubber or a resin as desired. Examples of such other components include resins, rubbers, various fillers (e.g., silica, calcium carbonate, and clay), anti-aging agents, oils, plasticizers, colorants, weathering agents, and reinforcing materials.

Physical Properties of Elastic Material

When a resin material is used as the elastic material (i.e., in a case of a tire frame for a resin tire), examples of the melting point of a resin contained in the resin material include from about 100° C. to about 350° C., and from the viewpoint of durability of a tire and productivity, the melting point is preferably from about 100° C. to about 250° C., and more preferably from about 120° C. to about 250° C.

The tensile elastic modulus, which is defined in JIS K7113:1995, of the elastic material (or the tire frame including the elastic material) itself is preferably from 50 MPa to 1,000 MPa, more preferably from 50 MPa to 800 MPa, particularly preferably from 50 MPa to 700 MPa. In a case in which the tensile elastic modulus of the elastic material is from 50 MPa to 1,000 MPa, the tire can be efficiently fitted to a rim while maintaining the shape of the tire frame.

The tensile strength, which is defined in JIS K7113 (1995), of the elastic material (or the tire frame including the elastic material) itself is usually from about 15 MPa to about 70 MPa, preferably from 17 MPa to 60 MPa, more preferably from 20 MPa to 55 MPa.

The tensile strength at yield, which is defined in JIS K7113 (1995), of the elastic material (or the tire frame including the elastic material) itself is preferably 5 MPa or greater, more preferably from 5 MPa to 20 MPa, particularly preferably from 5 MPa to 17 MPa. In a case in which the tensile strength at yield of the elastic material is 5 MPa or greater, the tire can endure deformation caused by a load applied to the tire during traveling or the like.

The tensile elongation at yield, which is defined in JIS K7113 (1995), of the elastic material (or the tire frame including the elastic material) itself is preferably 10% or greater, more preferably from 10% to 70%, particularly preferably from 15% to 60%. In a case in which the tensile elongation at yield of the elastic material is 10% or greater, a large elastic region is provided, so that favorable rim fittability can be attained.

The tensile elongation at break, which is defined in JIS K7113 (1995), of the elastic material (or the tire frame including the elastic material) itself is preferably 50% or greater, more preferably 100% or greater, particularly preferably 150% or greater, most preferably 200% or greater. In a case in which the tensile elongation at break of the elastic material is 50% or greater, favorable rim fittability can be attained, and the tire can be made unlikely to rupture at collision.

The deflection temperature under load (under a load of 0.45 MPa), which is defined in ISO75-2 or ASTM D648, of the elastic material (or the tire frame including the elastic material) itself is preferably 50° C. or higher, more preferably from 50° C. to 150° C., particularly preferably from 50° C. to 130° C. With the deflection temperature under load of the elastic material being 50° C. or higher, deformation of the tire frame can be inhibited even when vulcanization is performed in the production of the tire.

When a rubber material is used as the elastic material, any material used in usual rubber tires can be used as a rubber material, and the material is not particularly limited.

<Structure of Tire>

The tire according to an embodiment of the present disclosure is described below with reference to figures.

The figures provided below (FIG. 1A, FIG. 1B, FIG. 2, and FIG. 3) are provided as schematic illustrations, and sizes and shapes of each part are exaggerated to facilitate understanding. In the following embodiment, although a resin-metal composite member is used in a belt portion, the resin-metal composite member may further be used in other portions such as a bead portion.

First Embodiment

First, a tire 10 according to a first embodiment of the present disclosure is described below referring to FIGS. 1A and 1B.

Figure 1B:
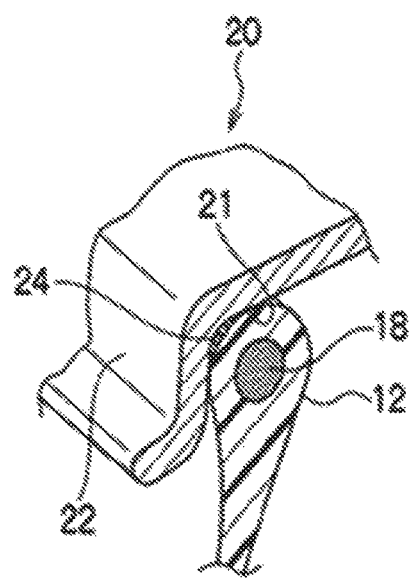
FIG. 1B is a cross-sectional view of a bead portion fitted to a rim.

FIG. 1A is a perspective view showing a cross-section of a part of the tire according to the first embodiment. FIG. 1B is a cross-sectional view of a bead portion fitted to a rim. As illustrated in FIG. 1A, the tire 10 of the first embodiment has a cross-sectional shape that is substantially the same as those of conventional ordinary rubber-made pneumatic tires.

The tire 10 has a tire frame 17 including a pair of bead portions 12 each of which comes into contact with a bead sheet 21 and a rim flange 22 of a rim 20, side portions 14 each of which extends outward from the bead portion 12 in the tire radial direction, and a crown portion (an outer circumferential portion) 16 which connects an outer end of one of the side portions 14 in the tire radial direction with an outer end of the other side portion 14 in the tire radial direction. The tire frame 17 is formed using a resin material (e.g., a polyamide-based thermoplastic elastomer). The tire frame 17 may be formed using a rubber material.

The tire frame 17 is formed by aligning annular tire frame half sections (tire frame pieces) 17A, which have the same shape and are each formed by integrally injection-molding one bead portion 12, one side portion 14 and a half-width crown portion 16, to face each other and joining them at the tire equatorial plane.

In each of the bead portions 12, an annular bead core 18 composed of a steel cord is embedded in the same manner as in conventional ordinary pneumatic tires. Further, an annular sealing layer 24 formed from a rubber that is a material having superior sealing performance than the resin material included in the tire frame 17 is formed on a part of each bead portion 12 that comes into contact with the rim 20, and at least on a part of each bead portion 12 that comes into contact with the rim flange 22 of the rim 20.

On the crown portion 16, a resin-metal composite member 26, which is a reinforcing cord, is helically wound in the circumferential direction of the tire frame 17 with at least a part thereof being embedded in the crown portion 16 in a cross-sectional view taken along the axial direction of the tire frame 17. On the tire radial-direction outer circumferential side of the resin-metal composite member 26, a tread 30 composed of a rubber that is a material having superior abrasion resistance than the resin material included in the tire frame 17 is arranged. The details of the resin-metal composite member 26 are described below.

In the tire 10 according to the first embodiment, the tire frame 17 is formed of a resin material, but the tire frame 17 may be formed using a rubber material. The tire frame half section 17A has a left-right symmetric shape, that is, one of the tire frame half sections 17A and the other tire frame A have the same shape, and therefore there is an advantage that only one type of a mold is required for forming the tire frame half section 17A.

In the tire 10 according to the first embodiment, the tire frame 17 is formed of a single type of resin material, but is not limited to such a tire frame. In the same manner as in a conventional usual pneumatic rubber tire, each portion of the tire frame 17 (e.g., a side portion 14, a crown portion 16, or a bead portion 12) may be formed using a different resin material each having different properties. The tire frame 17 may be formed of a single type of rubber material, or each portion of the tire frame 17 (e.g., a side portion 14, a crown portion 16, or a bead portion 12) may be formed using a different rubber material each having different properties. In each portion of the tire frame 17 (e.g., a side portion 14, a crown portion 16, or a bead portion 12), reinforcing materials (e.g., a polymeric material fiber, a metal fiber, a cord, a nonwoven fabric, and a woven fabric) may be embedded and disposed, and the tire frame 17 may be reinforced by the reinforcing materials.

In the tire 10 of the first embodiment, the tire frame half sections 17A are each molded by injection molding; however, the present disclosure is not restricted to this embodiment, and the tire frame half sections 17A may be molded by, for example, vacuum molding, pressure molding, or melt casting. Further, in the tire 10 of the first embodiment, the tire frame 17 is formed by joining two members (the tire frame half sections 17A); however, the present disclosure is not restricted to this embodiment, and the tire frame may be formed as a single member by a melted core method, split core method or blow molding using a low-melting-point metal, or may be formed by joining three or more members.

In the bead portion 12 of a tire 10, an annular bead core 18 formed of a metal cord such as a steel cord is embedded. As a member including a bead core 18, the resin-metal composite member can be used.

The bead core 18 may be formed of an organic fiber cord, a resin-coated organic fiber cord, or a hard resin other than a steel cord. The bead core 18 may be omitted as long as rigidity of the bead portion 12 is ensured, and engagement with a rim 20 is not problematic.

At a portion of a bead portion 12 which comes into contact with a rim 20 and a portion which comes into contact with at least a rim flange 22 of the rim 20, an annular sealing layer 24 formed of rubber is provided. The sealing layer 24 may be also formed at a portion at which a tire frame 17 (a bead portion 12) and a bead sheet 21 come into contact with each other. When rubber is used as a material for forming the sealing layer 24, it is preferred that a rubber which is the same kind as a rubber used in an outer surface of a bead portion of a conventional usual rubber pneumatic tire is used. When the tire frame 17 is formed from a resin material, the rubber sealing layer 24 may be omitted as long as a sealing property with respect to a rim 20 is ensured by only the resin material which configures the tire frame 17.

The sealing layer 24 may also be formed using other thermoplastic resin or thermoplastic elastomer that has superior sealing performance than the resin material forming the tire frame 17. Examples of such other thermoplastic resin include resins such as polyurethane-based resins, olefin-based resins, polystyrene-based resins, and polyester-based resins; and blends of these resins with a rubber or an elastomer. It is also possible to use a thermoplastic elastomer. Examples of the thermoplastic elastomer include polyester-based thermoplastic elastomers, polyurethane-based thermoplastic elastomers, olefin-based thermoplastic elastomers, combinations of these elastomers, and blends of these elastomers with a rubber.

Next, a reinforcing belt member formed of a resin-metal composite member 26 is described with reference to FIG. 2. As this resin-metal composite member 26, the above-described resin-metal composite member can be used.

Figure 2:
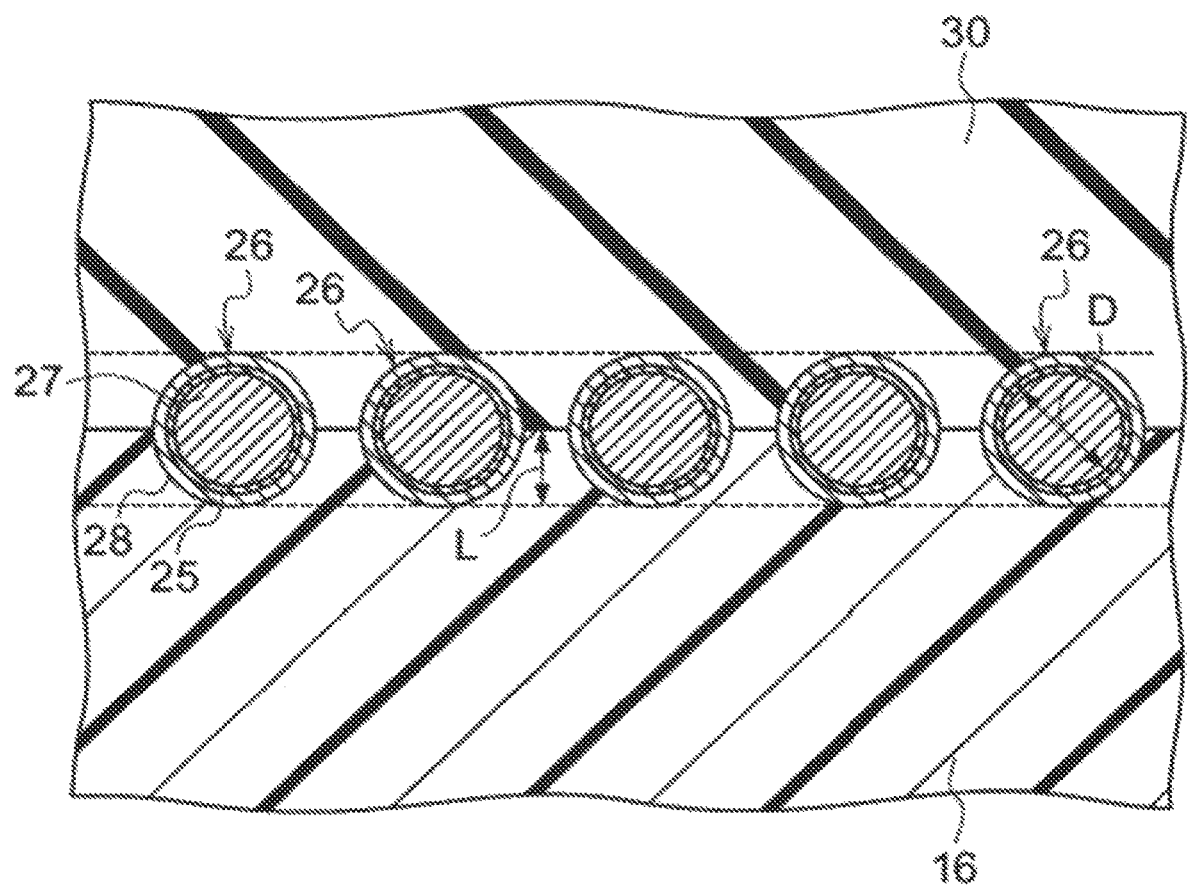
FIG. 2 is a cross-sectional view taken along a rotation axis of a tire and showing a state in which a reinforcing cord member is embedded in a crown portion of a tire frame of a tire according to a first embodiment.

FIG. 2 is a cross-sectional view of a tire 10 according to the first embodiment taken along the tire rotation axis, and shows a state in which a resin-metal composite member 26 is embedded in a crown portion of a tire frame 17.

As shown in FIG. 2, in a cross-sectional representation taken along an axial direction of the tire frame 17, at least a part of the resin-metal composite member 26 is embedded in a crown portion 16 and the resin-metal composite member 26 is helically wound. The portion of the resin-metal composite member 26 embedded in the crown portion 16 is in close contact with an elastic material (e.g., a rubber material or a resin material) which configures the crown portion 16 (tire frame 17). In FIG. 2, L represents an embedding depth of the resin-metal composite member 26 in a direction toward the tire rotation axis in the crown portion 16 (tire frame 17). In a certain embodiment, the embedding depth L of the resin-metal composite member 26 in the crown portion 16 is ½ of the diameter D of the resin-metal composite member 26.

The resin-metal composite member 26 has a structure in which the outer circumference of a metal member 27 (e.g., a steel cord composed of twisted steel fibers) serving as a core is covered with a covering resin layer 28 via an adhesive layer 25.

On the tire radial-direction outer circumferential side of the resin-metal composite member 26, the rubber-made tread 30 is arranged. Further, on the surface of the tread 30 that comes into contact with the road surface, a tread pattern configured by plural grooves is formed in the same manner as in conventional rubber-made pneumatic tires.

In the tire 10 of one embodiment, the resin-metal composite member 26 covered with the covering resin layer 28 containing a thermoplastic elastomer is embedded in close contact with the tire frame 17 formed from a resin material containing a thermoplastic elastomer of the same kind. Accordingly, the contact area between the covering resin layer 28 covering the metal member 27 and tire frame 17 is increased, and the adhesion durability between the resin-metal composite member 26 and the tire frame 17 is thus improved, as a result of which the tire exhibits excellent durability.

The embedding depth L of the resin-metal composite member 26 in the crown portion 16 is preferably ⅕ or greater, more preferably greater than ½, of the diameter D of the resin-metal composite member 26. It is still more preferable that the entirety of the resin-metal composite member 26 is embedded in the crown portion 16. When the embedding depth L of the resin-metal composite member 26 is greater than ½ of the diameter D of the resin-metal composite member 26, the resin-metal composite member 26 is unlikely to come out of the embedded portion because of the dimensions of the resin-metal composite member 26. Further, when the entirety of the resin-metal composite member 26 is embedded into the crown portion 16, since the surface (the outer circumferential surface) is made flat, entry of air to the periphery of the resin-metal composite member 26 can be inhibited even if a member is arranged on the crown portion 16 where the resin-metal composite member 26 is embedded.

In the tire 10 of the first embodiment, the tread 30 is formed from a rubber; however, in place of a rubber, a tread formed from a thermoplastic resin material that has superior abrasion resistance may be used as well.

Resin-Metal Composite Member 26

An aspect in which the above-described resin-metal composite member is used as a resin-metal composite member 26 is described below.

For example, the resin-metal composite member can be used as a belt layer that is formed by arranging one or a plurality of cord-shaped resin-metal composite members at an outer circumferential portion of a tire frame along a circumferential direction of a tire, a crossing belt layer in which a plurality of cord-shaped resin-metal composite members are arranged to form an angle with respect to the circumferential direction of a tire and to cross each other, and the like.

The resin-metal composite member is, in the resin-metal composite member, preferably arranged so that the average distance between adjacent metal members is from 400 μm to 3200 μm, more preferably arranged so that the average distance is from 600 μm to 2200 μm, and still more preferably arranged so that the average distance is 800 μm to 1500 μm. When the average distance between metal members of adjacent resin-metal composite members is 400 μm or more, weight gain of a tire is reduced, which can tend to result in increase in running fuel efficiency. When the average distance between metal members of adjacent resin-metal composite members is 3200 μm or less, a sufficient tire-reinforcing effect tends to be achieved.

In the present specification, "adjacent resin-metal composite members" refers to a certain resin-metal composite member and another resin-metal composite member which is closest to the resin-metal composite member, and includes both a case in which different resin-metal composite members are adjacent to each other and a case in which different portions of one resin-metal composite member are adjacent to each other (e.g., a case in which one resin-metal composite member is wound around an outer circumference of a tire frame plural times).

In the present specification, the "average distance between metal members" refers to a value obtained by the following formula.

Average Distance between Metal Members={Width of Belt Portion−(Thickness of Metal Member×$n$)}/($n$−1)  Formula:

The "belt portion" refers to a portion in which a resin-metal composite member is provided on an outer circumferential portion of a tire frame.

In the formula, "$n$" refers to a number of resin-metal composite members which are observed in a cross section of a tire frame provided with the resin-metal composite members cut along a direction perpendicular to a tire radial direction.

In the formula, the "Width of Belt Portion" refers to a length along the outer circumferential surface of a tire frame and between resin-metal composite members which are present at both end positions of the belt portion among resin-metal composite members observed in the cross section (at positions each of which is farthest from the center line of the tire frame in a horizontal direction).

In the formula, the "Thickness of Metal Member" refers to the number average value of measured thicknesses at 5 randomly selected portions. When the metal member is configured by one metal cord, the measured thickness refers to the maximum diameter of a cross section of the metal member (the maximum distance between 2 points selected from the outer circumference of the cross section of the metal member). When the metal member is configured by a plurality of metal cords, the measured thickness refers to a diameter of the smallest circle among circles which involve all cross sections of the plurality of metal cords observed in a cross section of the metal member.

When metal members having different thicknesses are included in the belt portion, the thickness of the thickest metal member is referred to as the "Thickness of Metal Member".

Next, a method of producing the tire of the first embodiment is described.

[Tire Frame Molding Step]

First, tire frame half sections each supported on a thin metal support ring are aligned to face each other. Subsequently, a joining mold is placed such that it comes into contact with the outer circumferential surfaces of the abutting parts of the tire frame half sections. It is noted here that the joining mold is configured to press the peripheries of the joining parts (abutting parts) of the tire frame half sections with a prescribed pressure (not illustrated). Then, the peripheries of the joining parts of the tire frame half sections are pressed at a temperature equal to or higher than a temperature of the melting point (or softening point) of the thermoplastic resin material (a polyamide-based thermoplastic elastomer in the present embodiment) forming the resulting tire frame. When the joining parts of the tire frame half sections are heated and pressurized by the joining mold, the joining parts are melted and the tire frame half sections are fused together, as a result of which these members are integrated to form the tire frame 17.

(Resin Cord Member Forming Step)

A resin cord member forming step for forming a resin cord member from the resin-metal composite member is described below.

First, a metal member 27 is unwound from, for example, a reel, and the surface of the metal member 27 is cleaned. Next, the outer circumference of the metal member 27 is covered with an adhesive (e.g., an adhesive containing a polyester-based thermoplastic elastomer having a polar functional group, and a styrene-based elastomer) extruded from an extruder to form a layer for forming an adhesive layer 25. Then, the surface of the layer is further covered with a resin (e.g., a thermoplastic elastomer) extruded from an extruder to form a resin-metal composite member 26 in which the outer circumference of the metal member 27 is covered with a covering resin layer 28 via the adhesive layer 25. The obtained resin-metal composite member 26 is wound around a reel 58.

[Resin Cord Member Winding Step]

Figure 3:
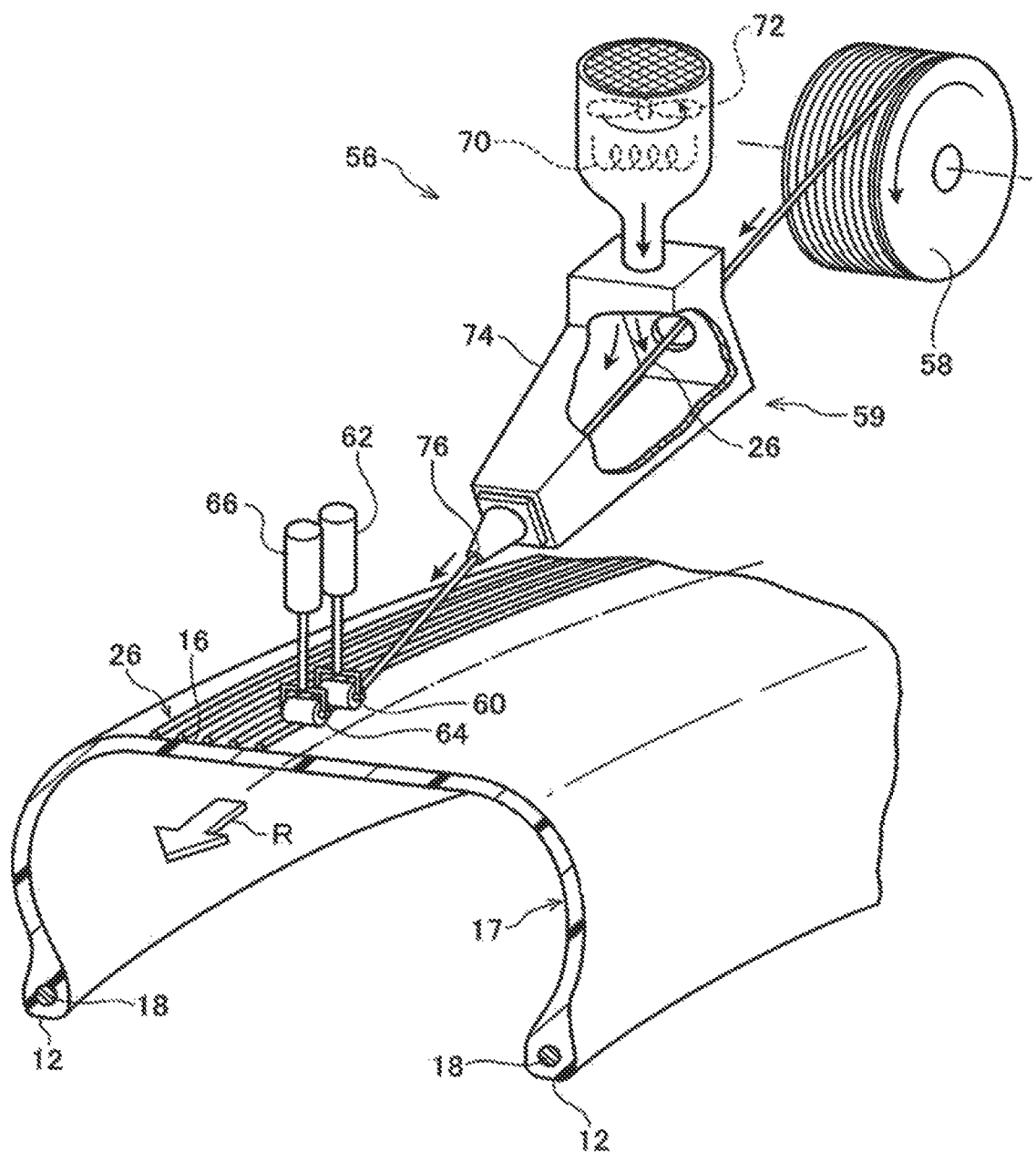
FIG. 3 is an explanatory view for explaining operation of arranging a reinforcing cord member on a crown portion of a tire frame using a reinforcing cord member heating device and rollers.

The resin cord member winding step is described below referring to FIG. 3. FIG. 3 is an explanatory view for explaining operation of arranging the resin cord member on the crown portion of the tire frame using a resin cord member heating device and rollers. In FIG. 3, a resin cord member feeding apparatus 56 includes: the reel 58, on which the resin-metal composite member 26 is wound; a resin cord member heating device 59, which is arranged on the cord transfer direction downstream side of the reel 58; a first roller 60, which is arranged on the resin-metal composite member 26 transfer direction downstream side; a first cylinder device 62, which moves the first roller 60 in a direction toward or away from the tire outer circumferential surface; a second roller 64, which is arranged on the resin-metal composite member 26 transfer direction downstream side of the first roller 60; and a second cylinder device 66, which moves the second roller 64 in a direction toward or away from the tire outer circumferential surface. The second roller 64 can be utilized as a cooling roller made of a metal. Further, the surface of the first roller 60 or the surface of the second roller 64 is coated with a fluororesin (TEFLON (registered trademark) in the present embodiment) so as to inhibit adhesion of the melted or softened resin material. As a result, the heated resin cord member is firmly integrated with the resin of the tire frame.

The resin cord member heating device 59 includes a heater 70 and a fan 72, which generate hot air. In addition, the resin cord member heating device 59 includes: a heating box 74, into which hot air is supplied and in which the resin-metal composite member 26 passes through the inner space; and a discharge outlet 76, through which the thus heated resin-metal composite member 26 is discharged.

In this step, first, the temperature of the heater 70 of the resin cord member heating device 59 is increased, and the ambient air heated by the heater 70 is sent to the heating box 74 by an air flow generated by rotation of the fan 72. Then, the resin-metal composite member 26 unwound from the reel 58 is transferred into the heating box 74 whose inner space has been heated with hot air, whereby the resin-metal composite member 26 is heated (for example, the temperature of the resin-metal composite member 26 is increased to about 100° C. to about 250° C.). The thus heated resin-metal composite member 26 passes through the discharge outlet 76 and is helically wound with a constant tension around the outer circumferential surface of the crown portion 16 of the tire frame 17 rotating in the direction of an arrow R as illustrated in FIG. 3. Here, once the covering resin layer of the heated resin-metal composite member 26 comes into contact with the outer circumferential surface of the crown portion 16, the resin material of the part in contact is melted or softened, and thereby melt-joined to the resin of the tire frame and integrated into the outer circumferential surface of the crown portion 16. In this process, since the resin cord member is also melt-joined with the resin cord member adjacent thereto, the winding is performed with no gap. As a result, entry of air into the parts where the resin-metal composite member 26 is embedded is inhibited.

The embedding depth L of the resin-metal composite member 26 can be adjusted by changing the heating temperature of the resin-metal composite member 26, the tension acting on the resin-metal composite member 26, the pressure applied by the first roller 60, and the like. In one embodiment, the embedding depth L of the resin-metal composite member 26 is set to be ⅕ or greater of the diameter D of the resin-metal composite member 26.

Next, the tread 30 in a belt shape is wound around the outer circumferential surface of the tire frame 17 in which the resin-metal composite member 26 has been embedded, and the resultant is heated (vulcanized) in a vulcanization can or a mold. The tread 30 may be composed of an unvulcanized rubber or a vulcanized rubber.

Thereafter, the sealing layer 24, which is composed of a vulcanized rubber, is bonded to each bead portion 12 of the tire frame 17 using an adhesive or the like, whereby the tire 10 is completed.

In the method of producing the tire of the first embodiment, the joining parts of the tire frame half sections 17A are heated using a joining mold; however, the present disclosure is not restricted to this embodiment, and the tire frame half sections 17A may be joined together by, for example, heating the joining parts using a separately arranged high-frequency heater or the like, or softening or melting the joining parts in advance by irradiation with hot air, infrared radiation or the like, and subsequently applying a pressure to the joining parts using a joining mold.

In the method of producing the tire of the first embodiment, the resin cord member feeding apparatus 56 has two rollers, which are the first roller 60 and the second roller 64; however, the present disclosure is not restricted to this configuration, and the resin cord member feeding apparatus 56 may have only one of these rollers (i.e., a single roller).

In the method of producing the tire of the first embodiment, an aspect in which the resin-metal composite member 26 is heated and the thus heated resin-metal composite member 26 melts or softens the part of the surface of the tire frame 17 that is in contact with the resin-metal composite member 26 is adopted; however, the present disclosure is not restricted to this embodiment, and a configuration in which, without heating the resin-metal composite member 26, the outer circumferential surface of the crown portion 16 where the resin-metal composite member 26 is to be embedded is heated using a hot air-generating apparatus and the resin-metal composite member 26 is subsequently embedded in the crown portion 16, may be adopted as well.

Further, in the method of producing the tire of the first embodiment, an aspect in which the heat source of the resin cord member heating device 59 includes the heater and the fan is adopted; however, the present disclosure is not restricted to this embodiment, and an aspect in which the resin-metal composite member 26 is directly heated by radiant heat (e.g., infrared radiation) may be adopted as well.

Moreover, in the method of producing the tire of the first embodiment, an aspect in which melted or softened parts of the thermoplastic resin material where the resin-metal composite member 26 is embedded are forcibly cooled by the second roller 64 made of a metal is adopted; however, the present disclosure is not restricted to this embodiment, and an aspect in which cold air is directly blown to the parts where the thermoplastic resin material has been melted or softened and the melted or softened parts of the thermoplastic resin material is thereby forcibly cooled may be adopted as well.

From the production standpoint, it is easy to helically wind the resin-metal composite member 26; however, for example, a method of arranging the resin-metal composite member 26 discontinuously in the width direction may also be contemplated.

In the method of producing the tire of the first embodiment, an aspect in which the belt-shaped tread 30 is wound around the outer circumferential surface of the tire frame 17 where the resin-metal composite member 26 has been embedded and the tread 30 is subsequently heated (vulcanized) is adopted; however, the present disclosure is not restricted to this embodiment, and an aspect in which a vulcanized belt-shaped tread is bonded on the outer circumferential surface of the tire frame 17 using an adhesive or the like may be adopted as well. Examples of the vulcanized belt-shaped tread include precured treads that are used in retreaded tires.

The tire 10 of the first embodiment of the present invention is a so-called tubeless tire in which an air chamber is formed between the tire 10 and the rim 20 by fitting the bead portions 12 to the rim 20; however, the present invention is not restricted to this embodiment, and the tire in the present disclosure may be a complete tube shape.

Thus far, the present disclosure has been described referring to embodiments; however, these embodiments are merely examples, and the present disclosure can be carried out with various modifications within a range that does not depart from the spirit of the present disclosure. It is to be understood that the scope of the rights of the present disclosure is not limited to these embodiments.

The tire according to one embodiment of the present disclosure encompasses tires of the following aspects.

<1> A resin-metal composite member for a tire, the member comprising: a metal member; an adhesive layer; and a covering resin layer in this order, wherein:

the adhesive layer includes a continuous phase containing a polyester-based thermoplastic elastomer having a polar functional group, and a discontinuous phase containing a styrene-based elastomer, and a ratio of the continuous phase with respect to an entirety of the adhesive layer is from 60% by mass to 93% by mass.

<2> The resin-metal composite member for a tire according to <1>, wherein the polyester-based thermoplastic elastomer having a polar functional group has, as the polar functional group, at least one selected from the group consisting of an epoxy group, a carboxy group and an anhydride group thereof, and an amino group.

<3> The resin-metal composite member for a tire according to <1> or <2>, wherein a styrene ratio in the styrene-based elastomer is from 10% by mass to 45% by mass.

<4> The resin-metal composite member for a tire according to any one of <1> to <3>, wherein the styrene-based elastomer contains at least one selected from a styrene-butadiene copolymer, a styrene-isoprene copolymer, a styrene-ethylene-butylene copolymer, a styrene-ethylene-propylene copolymer, a styrene-isobutylene copolymer, or a styrene-ethylene-isoprene copolymer.

<5> The resin-metal composite member for a tire according to any one of <1> to <3>, wherein the styrene-based elastomer contains at least one selected from a styrene-ethylene-butylene copolymer, a styrene-ethylene-propylene copolymer, a styrene-isobutylene copolymer, or a styrene-ethylene-isoprene copolymer.

<6> The resin-metal composite member for a tire according to any one of <1> to <5>, wherein the styrene-based elastomer has a polar functional group.

<7> The resin-metal composite member for a tire according to any one of <1> to <6>, wherein the styrene-based elastomer contains at least one of a block copolymer or a random copolymer.

<8> A tire, comprising:

a circular tire frame containing an elastic material; and the resin-metal composite member for a tire according to any one of <1> to <7>.

<9> The tire according to <8>, wherein the resin-metal composite member for a tire configures a reinforcing belt member that is wound around an outer circumferential portion of the tire frame in a circumferential direction.

<10> The tire according to <8>, wherein the resin-metal composite member for a tire configures a bead member.

EXAMPLES

The present disclosure is specifically described below with reference to Examples, but not limited thereto in any way. The expression "parts" refers to parts by mass, unless otherwise indicated.

Example 3

<Preparation of Resin-Metal Composite Member>

According to the resin cord member forming step in the method of producing a tire in the first embodiment, a layer for forming an adhesive layer was formed by attaching a heat-melted composition for forming an adhesive layer having a formulation as shown in Table 1 (i.e., a mixture of "TPC-1" and "SEBS-5") to a multifilament having an average diameter of φ1.15 mm (a stranded wire obtained by twisting seven monofilaments (made of steel, strength: 280 N, elongation: 3%) each having a diameter of φ0.35 mm).

Then, a composition for forming a covering resin layer having a formulation as shown in Table 1 (i.e., a covering resin P-1) extruded by an extruder was attached to the outer circumference of the layer for forming an adhesive layer to cover the layer, and resulting product was cooled. Conditions for the extrusion were as follows: a metal member temperature of 200° C., a covering resin temperature of 240° C., and an extrusion speed of 30 m/min.

As described above, a resin-metal composite member having a structure in which an outer circumference of a multifilament (a metal member) was covered with a covering resin layer formed of a composition for forming a covering resin layer (a covering resin P-1) via an adhesive layer formed of a composition for forming an adhesive layer (a mixture of "TPC-1" and "SEBS-5") was prepared. The average thickness of an adhesive layer and the average thickness of a covering resin layer in a resin-metal composite member are shown in Table 1.

<Production of Tire Having Resin-Metal Composite Member as Reinforcing Belt Member>

According to the method of producing a tire according to the first embodiment, a tire frame formed of a resin material including a polyester-based thermoplastic elastomer ("HYTREL 5557" manufactured by DU PONT-TORAY CO., LTD., melting point: 207° C.) was prepared.

Then, using the resulting resin-metal composite member and tire frame, a green tire in which the resin-metal composite member was arranged and wound around a crown portion of the tire frame and unvulcanized tread rubber was arranged on the wound resin-metal composite member was produced. The arrangement of the resin-metal composite member on the tire frame was performed so that the average distance between metal members of the adjacent resin-metal composite members was 1000 µm. The tire size was 245/35 R18. Thickness of the tread rubber was 10 mm.

Heat treatment (vulcanization of tread rubber) was applied to the green tire produced above under conditions at 170° C. for 18 minutes.

(Measurement of Tensile Elastic Modulus)

Separately from the tire production, a sample for measuring an elastic modulus was prepared by using the conditions used in the heat treatment (vulcanization of tread rubber) for the tire.

Specifically, a plate having a thickness of 2 mm formed of a composition for forming a covering resin layer having a formulation as shown in Table 1 (i.e., covering resin P-1) was prepared by injection molding, and samples for measuring an elastic modulus of a covering resin layer, which were #3 punched-out dumbbell-shaped test pieces according to JIS, were prepared. In addition, a plate having a thickness of 2 mm formed of a composition for forming an adhesive layer having a formulation as shown in Table 1 (i.e., a mixture of "TPC-1" and "SEBS-5") was prepared by injection molding, and samples for measuring an elastic modulus of an adhesive layer, which were #3 punched-out dumbbell-shaped test pieces according to JIS, were prepared.

In order to apply, to these samples, the same thermal history as that applied to the tire, temperature of an adhesive layer portion of a resin-metal composite member around the tire centerline portion during vulcanization was measured using a tire which was vulcanized under the same conditions as in the tires described in Examples and Comparative Example, the samples were heat treated using the temperature conditions obtained by the measurement and the time consumed for vulcanization, and the heat-treated samples were used as a "sample for measuring an elastic modulus of a covering resin layer" and a "sample for measuring elastic modulus of an adhesive layer", respectively.

Using the "sample for measuring an elastic modulus of a covering resin layer" and the "sample for measuring elastic modulus of an adhesive layer", a tensile elastic modulus of a covering resin layer and a tensile elastic modulus of an adhesive layer were measured by the above-described methods, respectively. The results are shown in Table 1.

<Measurement of Rate of Improvement in Water Barrier Properties>

Using the sample for measuring an elastic modulus of an adhesive layer, the rate of improvement in water barrier properties (%) was obtained by the following measurement and evaluated according to evaluation criteria provided below.

Specifically, a water vapor transmission rate was measured according to JIS Z 0208:1976 (Testing method of determination of the water vapor transmission rate of moisture-proof packaging materials (dish method) at 80° C. and 90% RH), and a rate of improvement (%) from a water vapor transmission rate of a sample for measuring water barrier properties in Comparative Example 1 as described below (hereinafter, also referred to as a "standard sample") was calculated. The rate of improvement (%) in water barrier properties is represented by the following formula, wherein a water vapor transmission rate of a target sample for evaluation is denoted by A (g/m²·24 h) and a water vapor transmission rate of a standard sample is denoted by B (g/m²·24 h). The results are shown in Table 1. A to C in the rate of improvement in water barrier properties in Table 1 represent evaluation results according to the following criteria, and the value in parentheses refers to a rate of improvement (%).

Formula: Rate of Improvement (%)=$\{(A-B)/A\} \times 100$ (Evaluation Criteria)
A: Rate of improvement=25% or more
B: Rate of improvement=from 10% to less than 25%
C: Rate of improvement=less than 10%

<Determination of Sea-Island Structure>

Using the sample for measuring an elastic modulus of an adhesive layer, whether a sea-island structure was present in the adhesive layer or not was determined.

Specifically, when the adhesive layer was observed by an atomic force microscope (AFM), a sea-island structure having a continuous phase (a sea portion) containing a hardened material of "TPC-1" and a discontinuous phase (an island portion) containing a hardened material of "SEBS-5" was observed.

Examples 6 to 8 and 13 and Comparative Example 1

Tires were produced in the same manner as in Example 3, except that the formulation of the composition for forming an adhesive layer for use in the formation of an adhesive layer (TPC-1 to EPTPS-8) and the formulation of the composition for forming a covering resin layer for use in the formation of a covering resin layer (a covering resin P-1 to a covering resin P-2) were changed to those shown in Table 1. In Table 1, a blank column in the formulation indicates that the corresponding component was not included.

The average thickness of an adhesive layer and the average thickness of a covering resin layer in a resin-metal composite member are shown in Table 1.

In the same manner as in Example 3, "samples for measuring elastic modulus of covering resin layers" and "samples for measuring elastic modulus of adhesive layers" were prepared, and the samples were measured for a tensile elastic modulus of a covering resin layer and a tensile elastic modulus of an adhesive layer, respectively. The results are shown in Table 1.

In the same manner as in Example 3, using "samples for measuring elastic modulus of adhesive layers", rates of improvement in water barrier properties were evaluated. The results are shown in Table 1.

In the same manner as in Example 3, using "samples for measuring elastic modulus of adhesive layers", determination of whether a sea-island structure was present or not was performed. As a result, in Examples 6 to 8 and 13, a sea-island structure having a continuous phase (a sea portion) containing a hardened material of "TPC-1" and a discontinuous phase (an island portion) containing a hardened material of a composition including at least one of "SEBS-3" to "EPTPS-8" was observed.

<Test of Initial Adhesion to Metal>

As an index of adhesion between an adhesive layer and a metal member and between a covering resin layer and an adhesive layer, peel force when an adhesive layer and a covering resin layer were peeled off from a metal member immediately after preparation of a resin-metal composite member was measured.

Specifically, using "TENSIRON RTF-1210" from A&D Company, Limited, 180° peel test was performed at a pull speed of 100 mm/min under a room-temperature environment (25° C.) to measure peel force (unit: N), and adhesiveness was evaluated according to the following evaluation criteria. The results are shown in Table 1.

(Evaluation Criteria)
A: Peel force is 10 N or more.
B: Peel force is from 5 N to less than 10 N.
C: Peel force is from 3 N to less than 5 N.
D: Peel force is less than 3 N.

TABLE 1

| | | | Example | | | | | Comparative Example |
|---|---|---|---|---|---|---|---|---|
| | | | 3 | 6 | 7 | 8 | 13 | 1 |
| Covering resin layer | Formulation | Covering resin P-1 | 100 | 100 | 100 | 100 | 20 | 100 |
| | | Covering resin P-2 | | | | | 80 | |
| | Average thickness (μm) | | 470 | 470 | 470 | 470 | 470 | 470 |
| | Tensile elastic modulus (MPa) | | 140 | 140 | 140 | 140 | 240 | 140 |
| Adhesive layer | Formulation | TPC-1 | 70 | 70 | 70 | 70 | 80 | 100 |
| | | SEBS-3 | | 25 | 20 | 10 | 20 | |
| | | SEBS-5 | 30 | | | | | |
| | | EPTPS-8 | | | 5 | 10 | 20 | |

TABLE 1-continued

|  |  | Example | | | | | Comparative Example |
|---|---|---|---|---|---|---|---|
|  |  | 3 | 6 | 7 | 8 | 13 | 1 |
|  | Average thickness (μm) | 30 | 30 | 30 | 30 | 30 | 30 |
|  | Tensile elastic modulus (MPa) | 130 | 190 | 200 | 210 | 200 | 300 |
|  | Rate of improvement in water barrier properties (%) | A(27) | B (22) | B (19) | B (11) | B (17) | C (0) |
| Evaluation | Test of initial adhesion to metal | B | B | B | B | B | A |

Components in Table 1 are as follows.
(Covering resin layer)
P-1: "HYTREL 5557", a polyester-based thermoplastic elastomer manufactured by DU PONT-TORAY CO., LTD., melting point: 207° C.
P-2: "HYTREL 6347", a polyester-based thermoplastic elastomer manufactured by DU PONT-TORAY CO., LTD., melting point: 215° C.
(Adhesive Layer)
TPC-1: "PRIMALLOY-AP GQ730", a maleic anhydride-modified polyester-based thermoplastic elastomer manufactured by Mitsubishi Chemical Corporation, melting point: 204° C., elastic modulus: 300 MPa
SEBS-3: product name: "TUFTEC H1041", a hydrogenated styrene-based thermoplastic elastomer manufactured by Asahi Kasei Corporation, a polystyrene-poly(ethylene-butylene)-polystyrene block copolymer (SEBS), styrene ratio: 30% by mass, degree of unsaturation: 20% or less
SEBS-5: product name: "TUFTEC H1221", a hydrogenated styrene-based thermoplastic elastomer manufactured by Asahi Kasei Corporation, a polystyrene-poly(ethylene-butylene)-polystyrene block copolymer (SEBS), styrene ratio: 12% by mass, degree of unsaturation: 20% or less
EPTPS-8: product name: "EPOFRIEND CT310", an unsaturated styrene-based thermoplastic elastomer having an epoxy group manufactured by Daicel Corporation, an epoxidized polystyrene-polybutadiene-polystyrene block copolymer (SBS), styrene ratio: 40% by mass, epoxy equivalent weight: from 1850 to 2250 g/eq All technical standards described in this specification are incorporated herein to the same extent as if each individual technical standard was specifically and individually indicated to be incorporated by reference.

The invention claimed is:

1. A resin-metal composite member for a tire, the member comprising: a metal member; an adhesive layer; and a covering resin layer, an outer circumference of the metal member being covered by the adhesive layer, and an outer circumference of the adhesive layer being covered by the covering resin, wherein:
the adhesive layer includes a continuous phase containing a polyester-based thermoplastic elastomer having a polar functional group, and a discontinuous phase containing a styrene-based elastomer, and
a ratio of the continuous phase with respect to an entirety of the adhesive layer is from 60% by mass to 93% by mass.

2. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group.

3. The resin-metal composite member for a tire according to claim 1, wherein a styrene ratio in the styrene-based elastomer is from 10% by mass to 45% by mass.

4. The resin-metal composite member for a tire according to claim 1, wherein the styrene-based elastomer contains at least one selected from a styrene-butadiene copolymer, a styrene-isoprene copolymer, a styrene-ethylene-butylene copolymer, a styrene-ethylene-propylene copolymer, a styrene-isobutylene copolymer, or a styrene-ethylene-isoprene copolymer.

5. The resin-metal composite member for a tire according to claim 1, wherein the styrene-based elastomer contains at least one selected from a styrene-ethylene-butylene copolymer, a styrene-ethylene-propylene copolymer, a styrene-isobutylene copolymer, or a styrene-ethylene-isoprene copolymer.

6. The resin-metal composite member for a tire according to claim 1, wherein the styrene-based elastomer has a polar functional group.

7. The resin-metal composite member for a tire according to claim 1, wherein the styrene-based elastomer contains at least one of a block copolymer or a random copolymer.

8. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group, and
wherein a styrene ratio in the styrene-based elastomer is from 10% by mass to 45% by mass.

9. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group, and
wherein the styrene-based elastomer contains at least one selected from a styrene-butadiene copolymer, a styrene-isoprene copolymer, a styrene-ethylene-butylene copolymer, a styrene-ethylene-propylene copolymer, a styrene-isobutylene copolymer, or a styrene-ethylene-isoprene copolymer.

10. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group, and
wherein the styrene-based elastomer contains at least one selected from a styrene-ethylene-butylene copolymer, a styrene-ethylene-propylene copolymer, a styrene-isobutylene copolymer, or a styrene-ethylene-isoprene copolymer.

11. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group, and
wherein the styrene-based elastomer has a polar functional group.

12. The resin-metal composite member for a tire according to claim 1, wherein the polyester-based thermoplastic elastomer having a polar functional group has, as the polar functional group, at least one selected from the group consisting of an epoxy group, a carboxy group and an anhydride group thereof, and an amino group, and
wherein the styrene-based elastomer contains at least one of a block copolymer or a random copolymer.

13. The resin-metal composite member for a tire according to claim 1, wherein a styrene ratio in the styrene-based elastomer is from 10% by mass to 45% by mass, and wherein the styrene-based elastomer contains at least one selected from a styrene-butadiene copolymer, a styrene-isoprene copolymer, a styrene-ethylene-butylene copolymer, a styrene-ethylene-propylene copolymer, a styrene-isobutylene copolymer, or a styrene-ethylene-isoprene copolymer.

14. The resin-metal composite member for a tire according to claim 1, wherein a styrene ratio in the styrene-based elastomer is from 10% by mass to 45% by mass, and wherein the styrene-based elastomer contains at least one selected from a styrene-ethylene-butylene copolymer, a styrene-ethylene-propylene copolymer, a styrene-isobutylene copolymer, or a styrene-ethylene-isoprene copolymer.

15. The resin-metal composite member for a tire according to claim 1, wherein a styrene ratio in the styrene-based elastomer is from 10% by mass to 45% by mass, and wherein the styrene-based elastomer has a polar functional group.

16. The resin-metal composite member for a tire according to claim 1, wherein a styrene ratio in the styrene-based elastomer is from 10% by mass to 45% by mass, and wherein the styrene-based elastomer contains at least one of a block copolymer or a random copolymer.

17. The resin-metal composite member for a tire according to claim 1, wherein the styrene-based elastomer contains at least one selected from a styrene-butadiene copolymer, a styrene-isoprene copolymer, a styrene-ethylene-butylene copolymer, a styrene-ethylene-propylene copolymer, a styrene-isobutylene copolymer, or a styrene-ethylene-isoprene copolymer, and wherein the styrene-based elastomer has a polar functional group.

18. A tire, comprising:

a circular tire frame containing an elastic material; and the resin-metal composite member for a tire according to claim 1.

19. The tire according to claim 18, wherein the resin-metal composite member for a tire is a reinforcing belt member that is wound around an outer circumferential portion of the tire frame in a circumferential direction.

20. The tire according to claim 18, wherein the resin-metal composite member for a tire is a bead member.

* * * * *